July 5, 1927.
H. J. BAUR
FARE BOX
Filed March 19, 1920
1,634,441
16 Sheets-Sheet 1
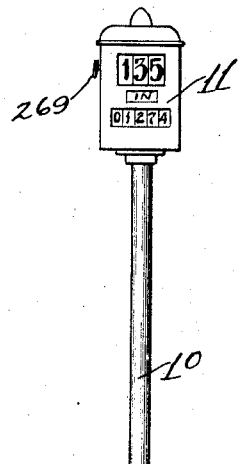
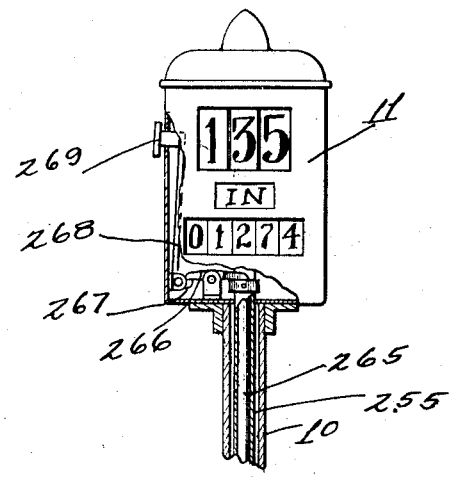
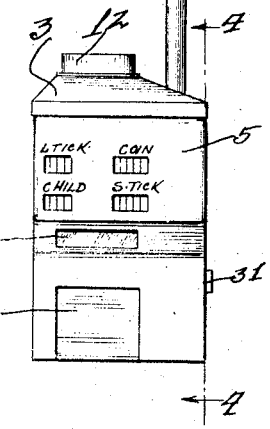
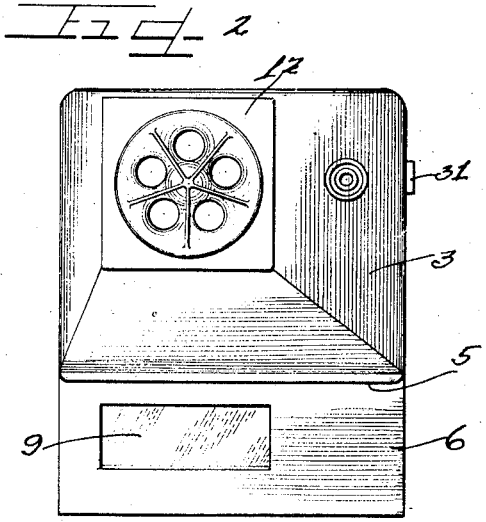
Witnesses
J. V. Angell
Charles Hill Jr.
Inventor
Hugo J. Baur
by Charles W. Hill
Atty.

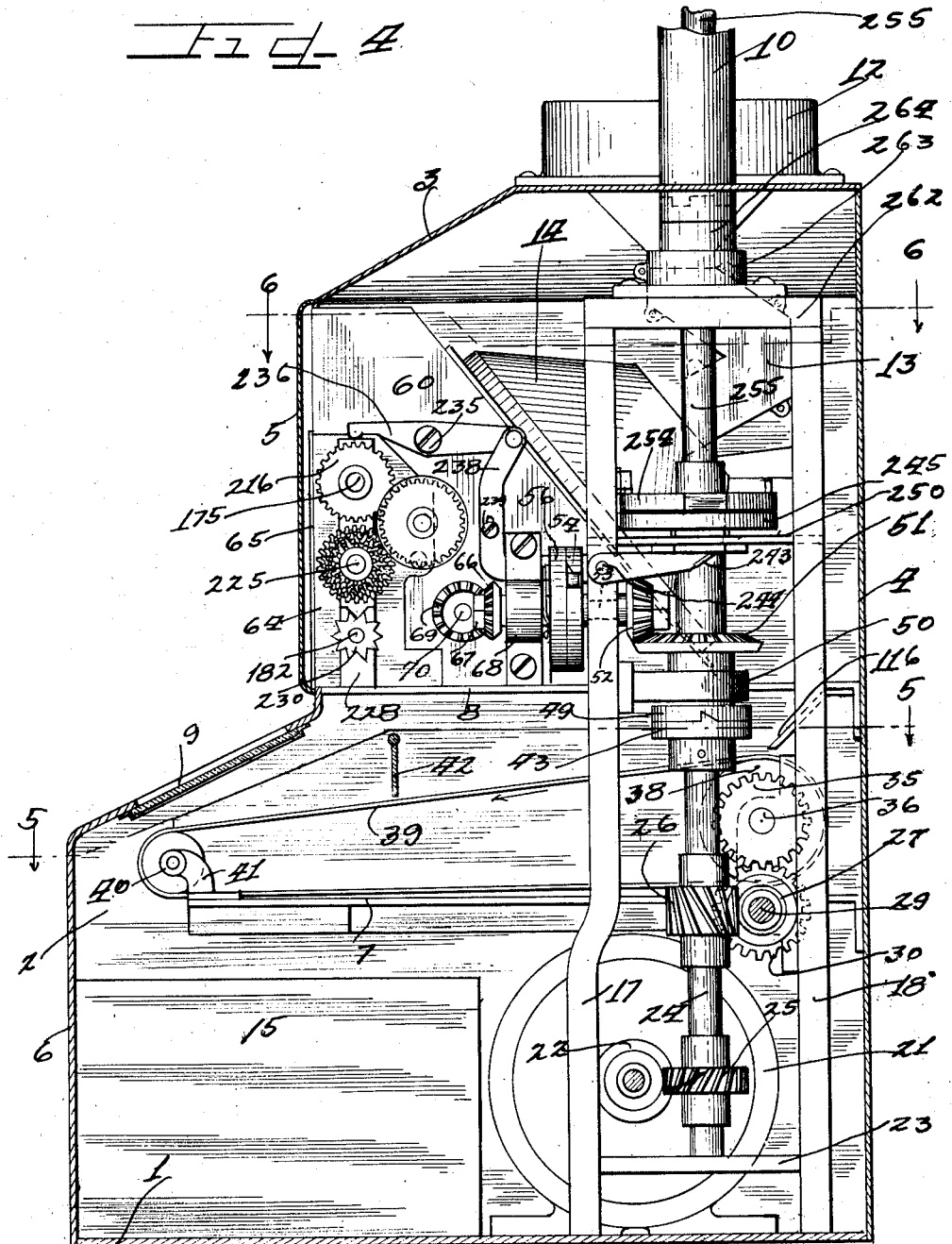

July 5, 1927.
H. J. BAUR
FARE BOX
Filed March 19, 1920
1,634,441
16 Sheets-Sheet 3
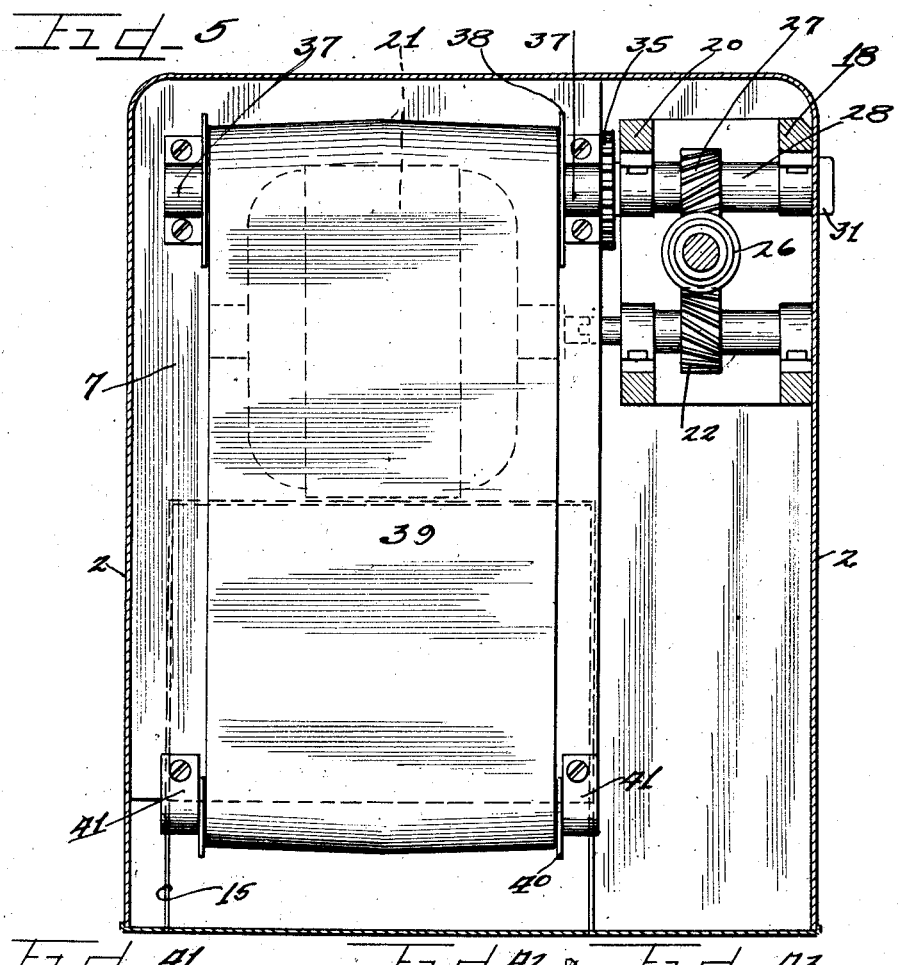
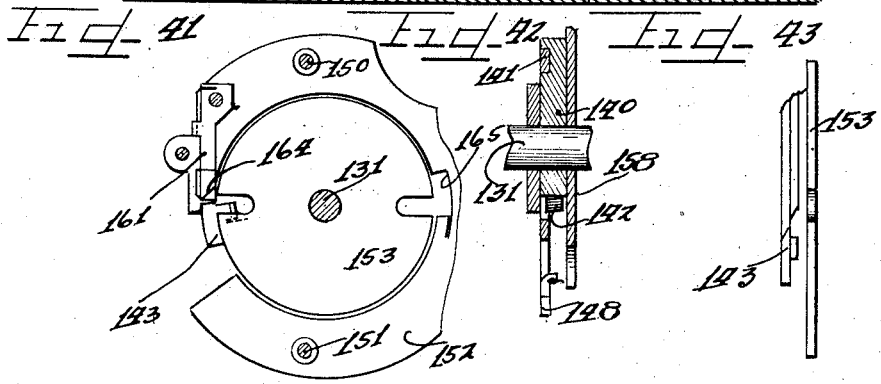

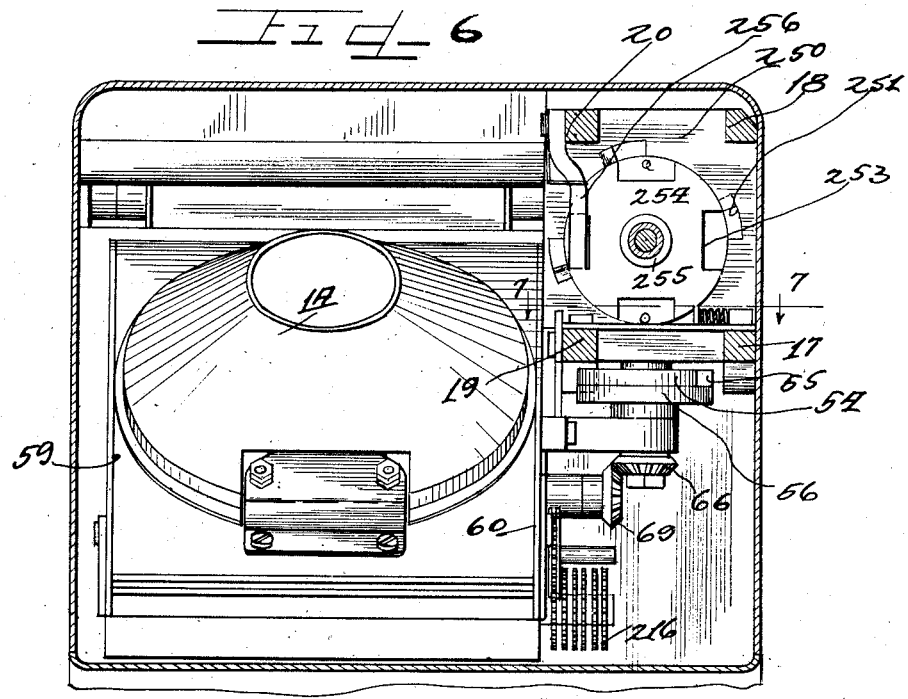
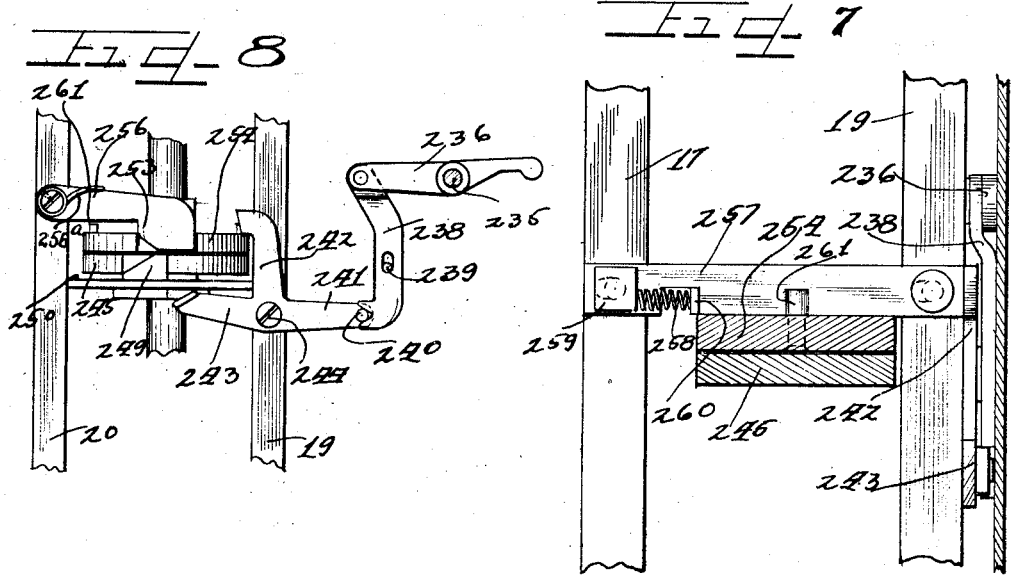

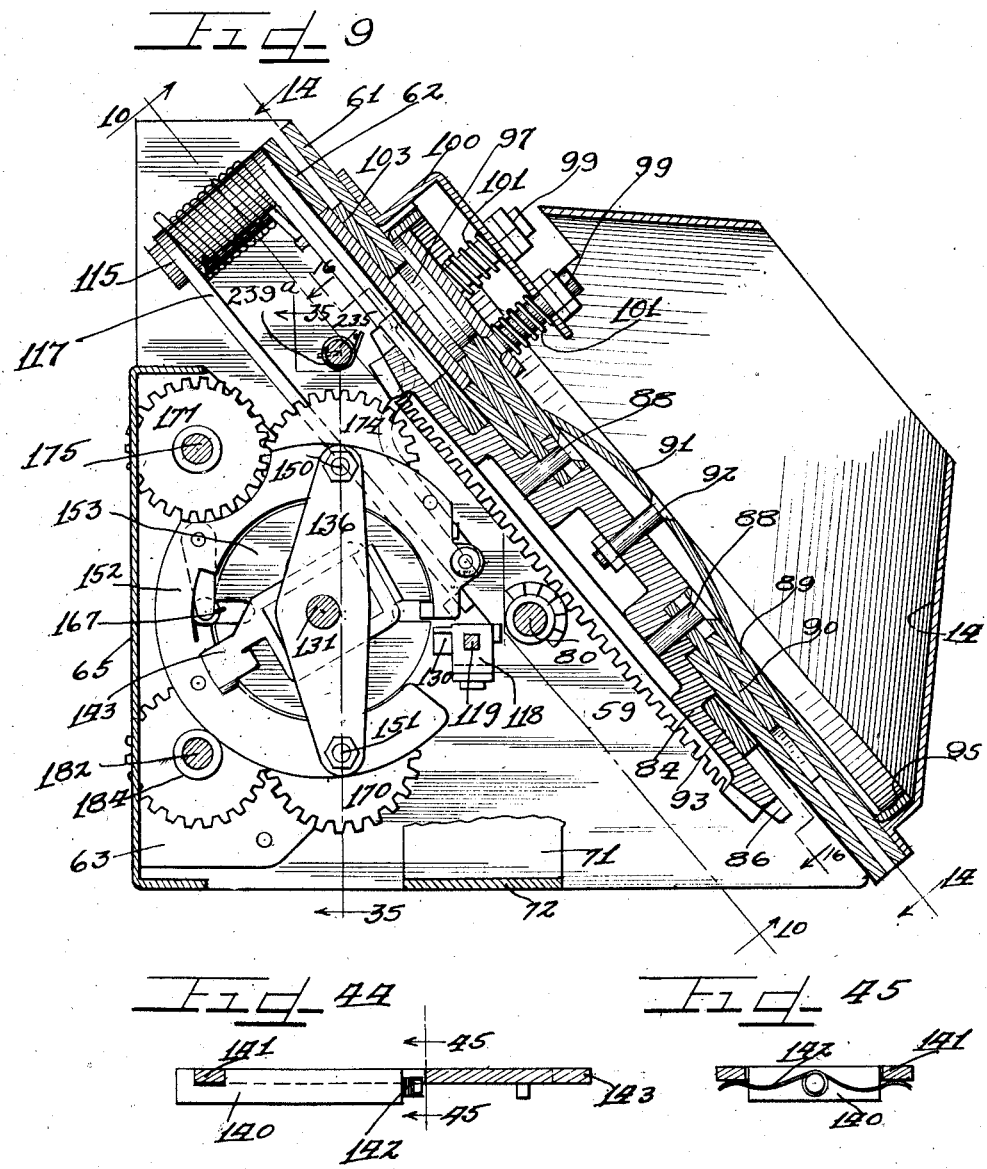

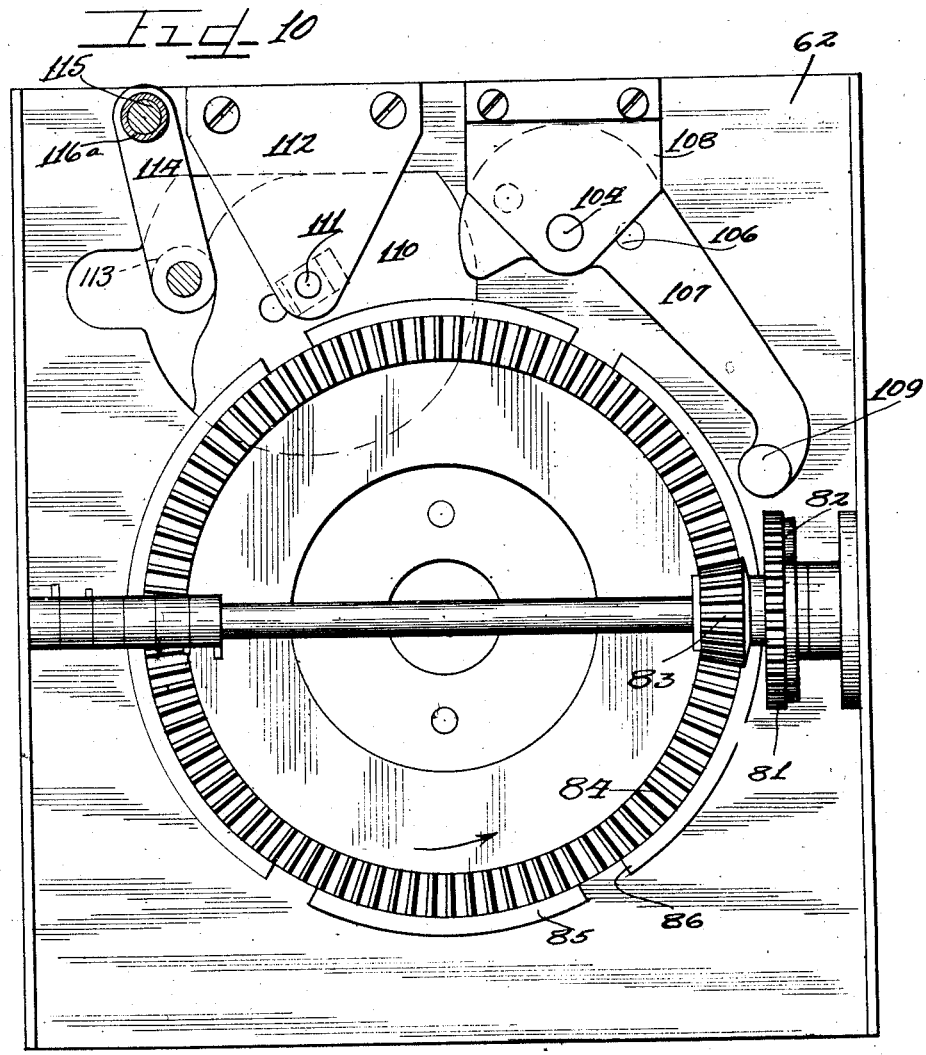

July 5, 1927.
H. J. BAUR
FARE BOX
Filed March 19, 1920 16 Sheets-Sheet 7
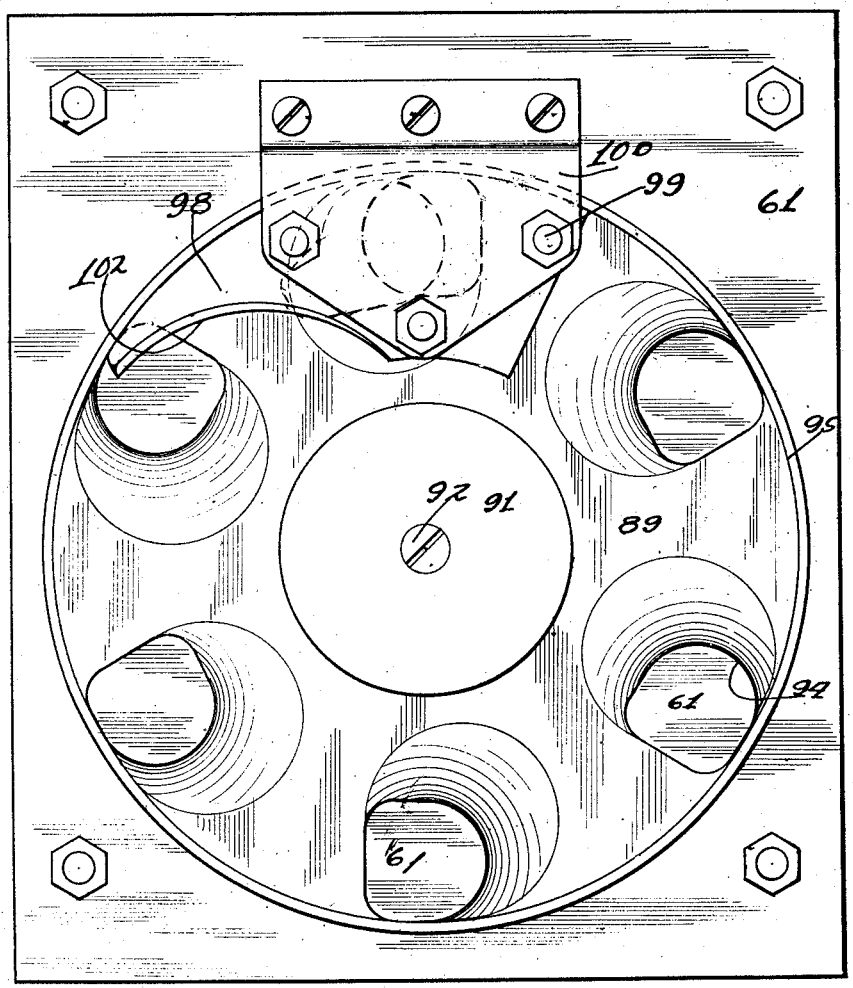
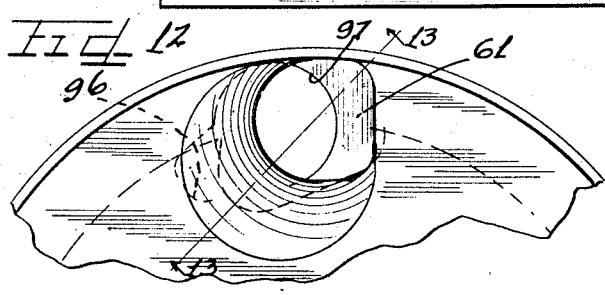
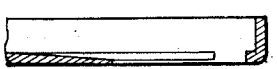

July 5, 1927.
H. J. BAUR
FARE BOX
Filed March 19, 1920    16 Sheets-Sheet 8
1,634,441
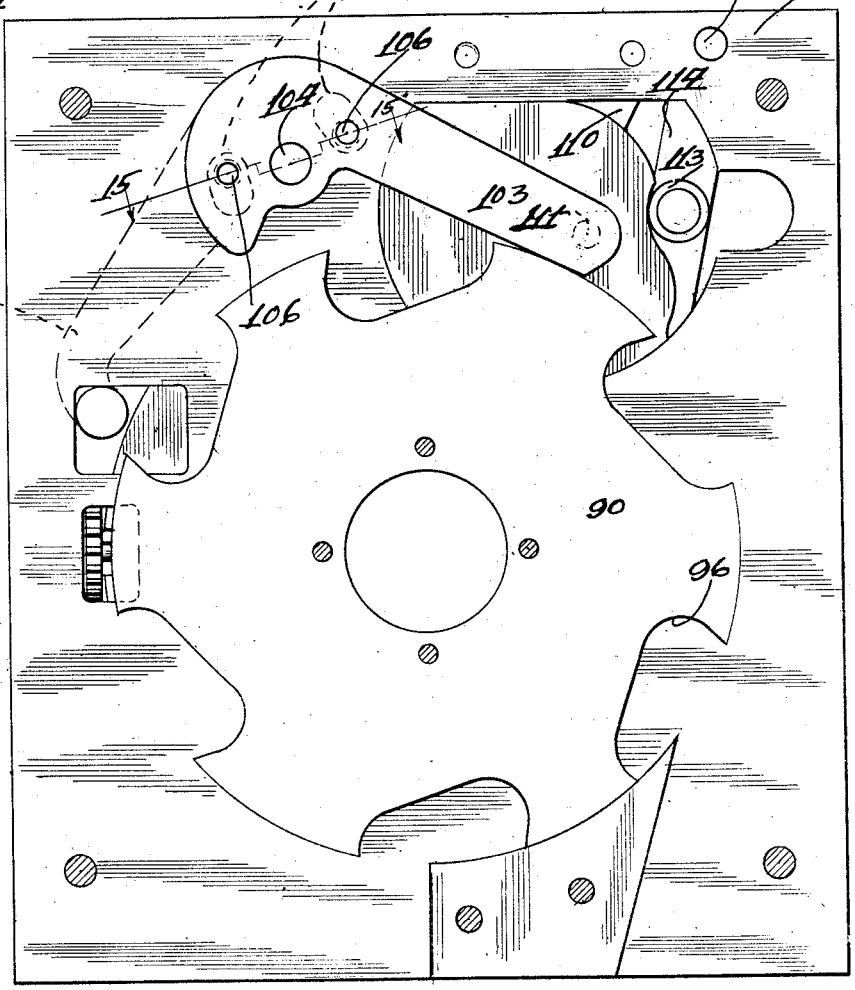
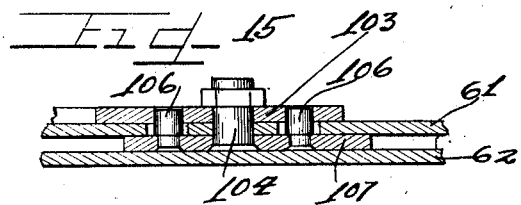

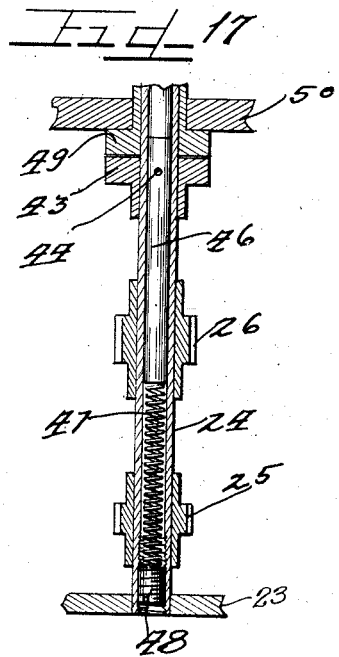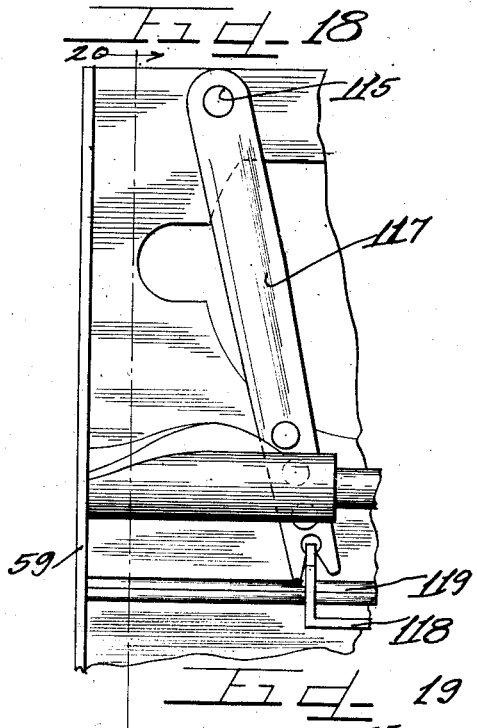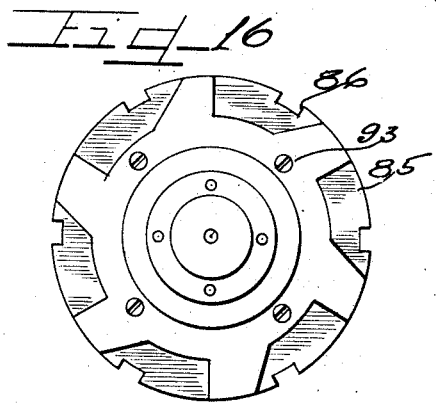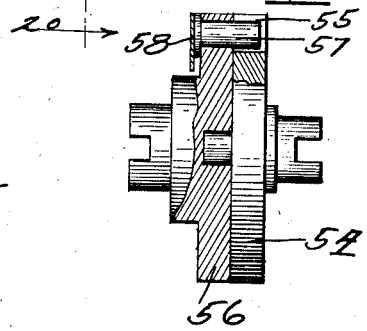

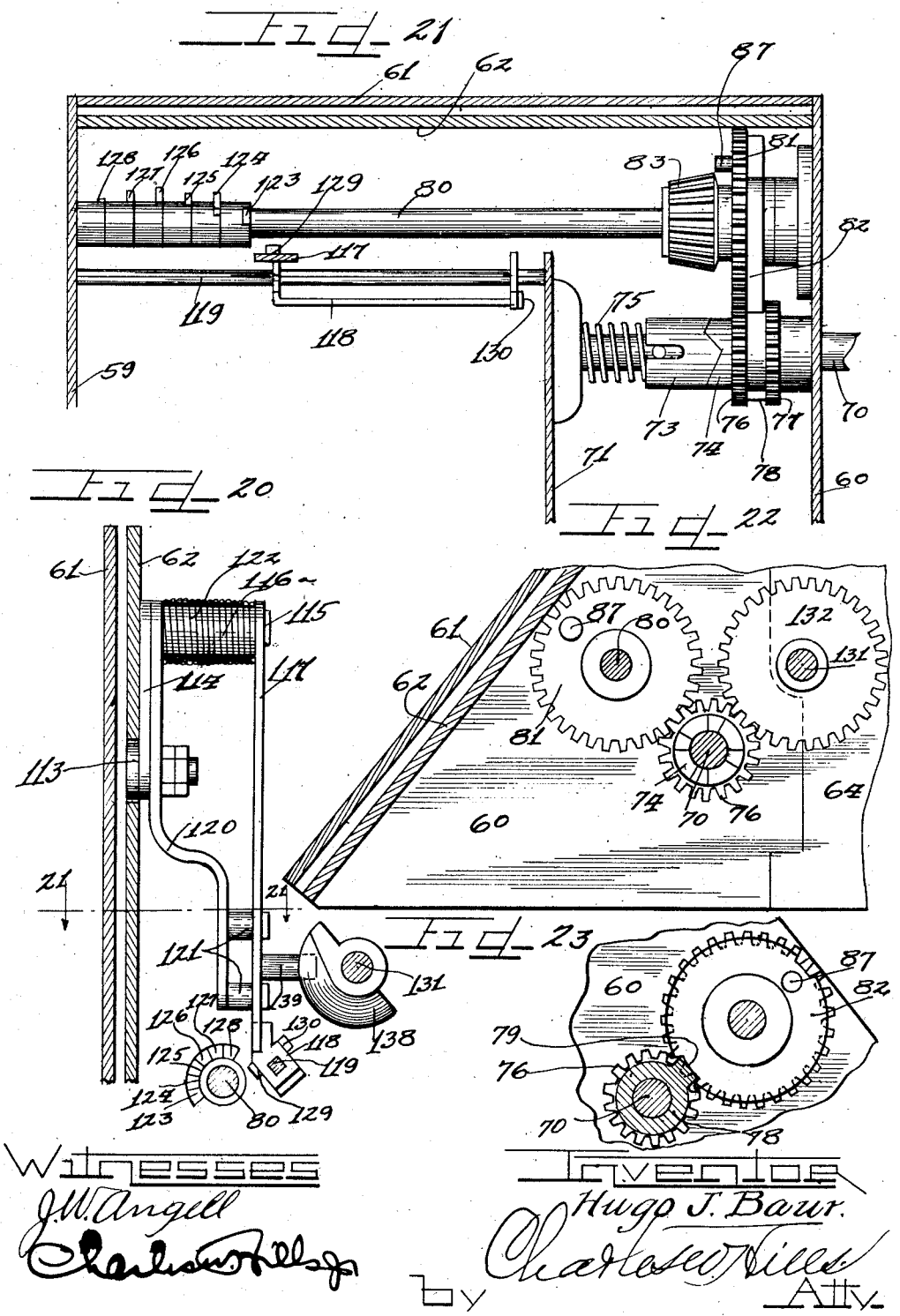

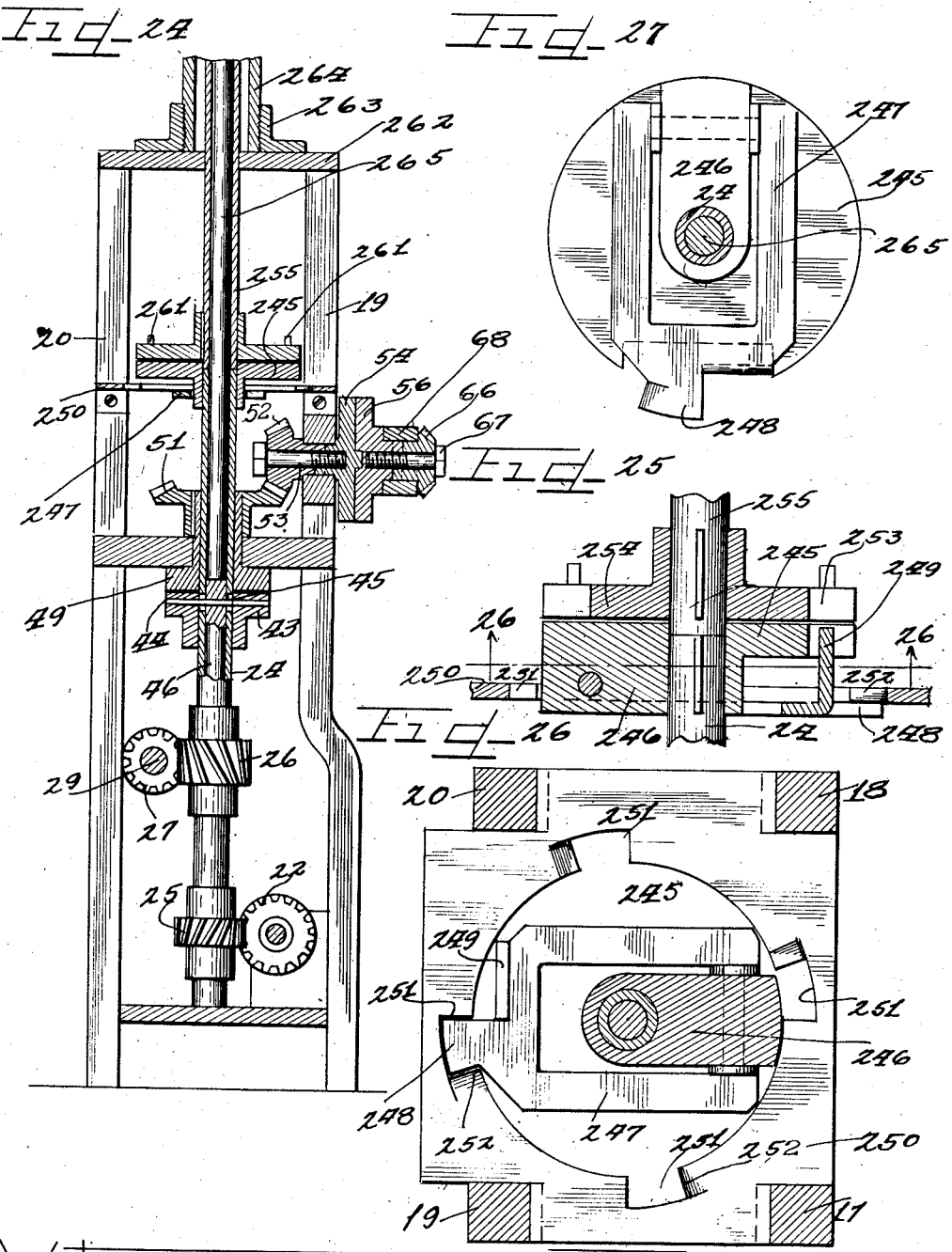

July 5, 1927.
H. J. BAUR
FARE BOX
Filed March 19, 1920
1,634,441
16 Sheets-Sheet 12
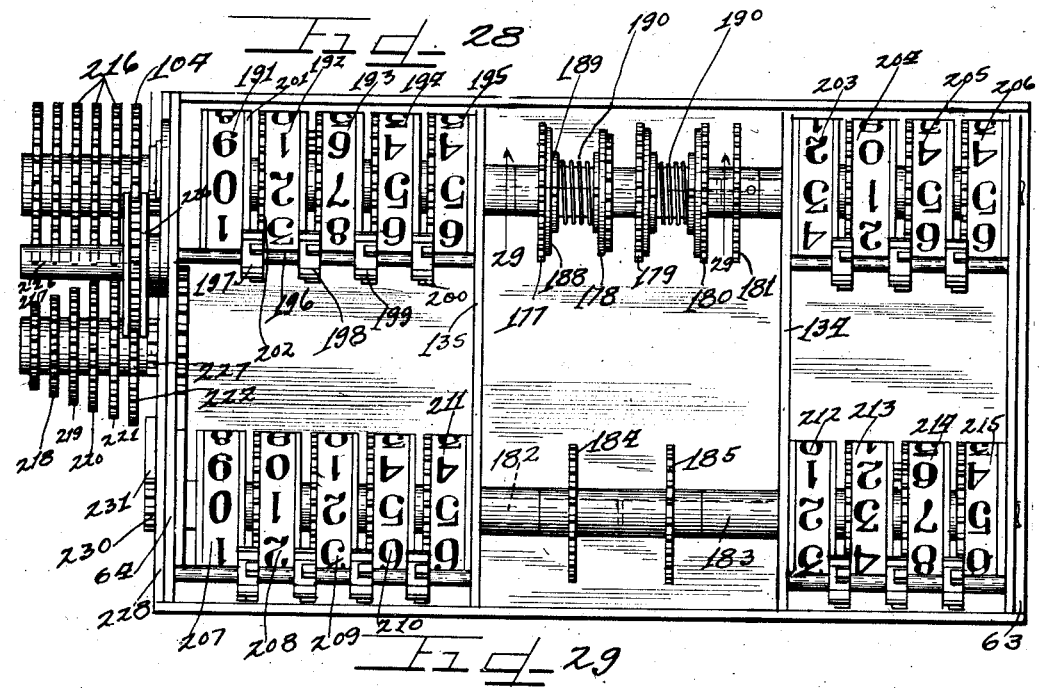
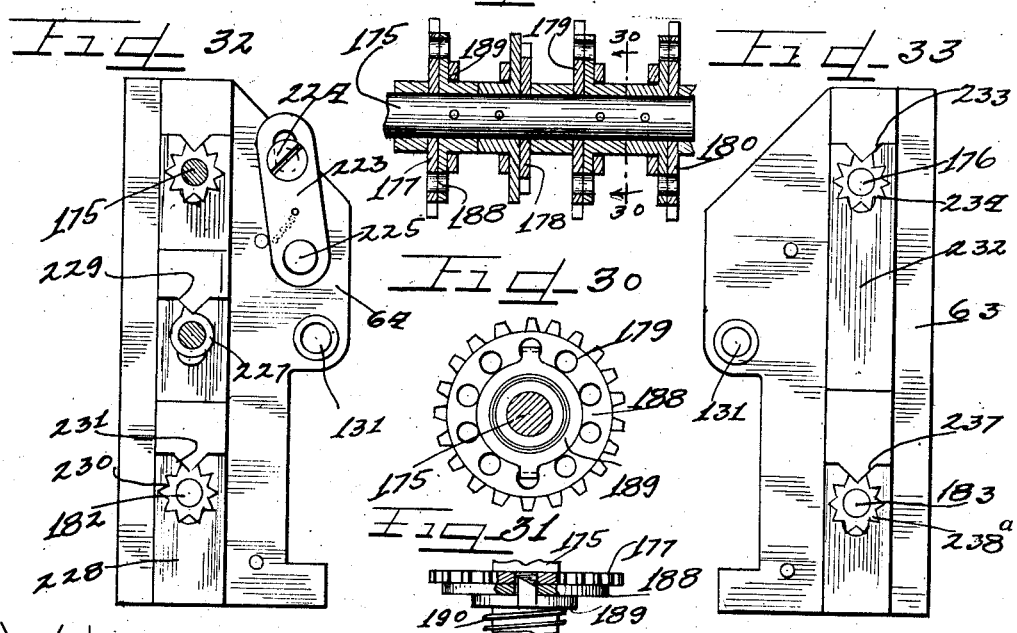
Witnesses
J. W. Angell
Charles W. Bellop Jr.
Inventor
Hugo J. Baur.
by Charles W. Hills
Atty.

July 5, 1927.
H. J. BAUR
FARE BOX
Filed March 19, 1920
1,634,441
16 Sheets-Sheet 13
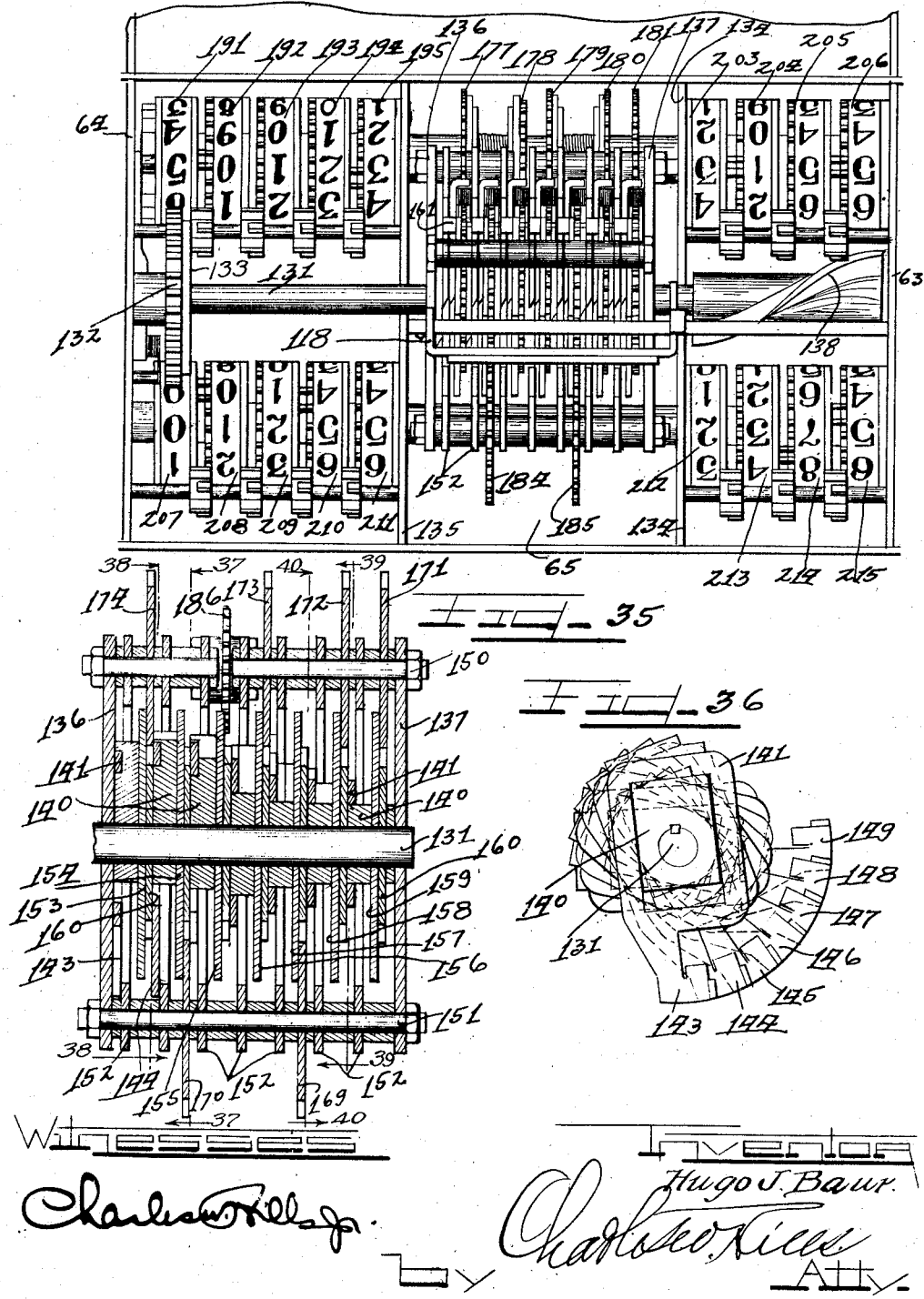

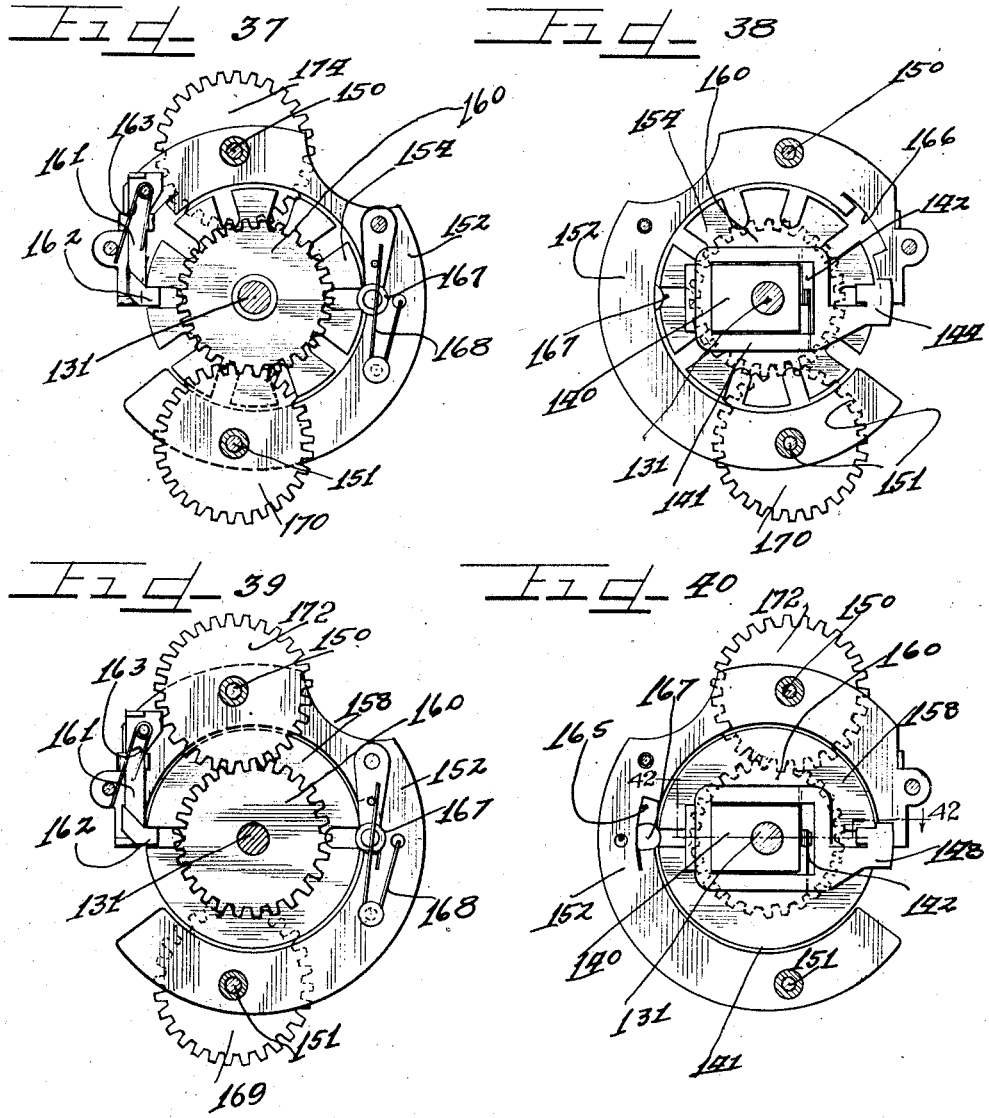

July 5, 1927.

H. J. BAUR

FARE BOX

Filed March 19, 1920    16 Sheets-Sheet 15

1,634,441

WITNESSES
INVENTOR
Hugo J. Baur
By Charles W. Neill
Atty.

July 5, 1927.
H. J. BAUR
FARE BOX
Filed March 19, 1920 16 Sheets-Sheet 16
1,634,441
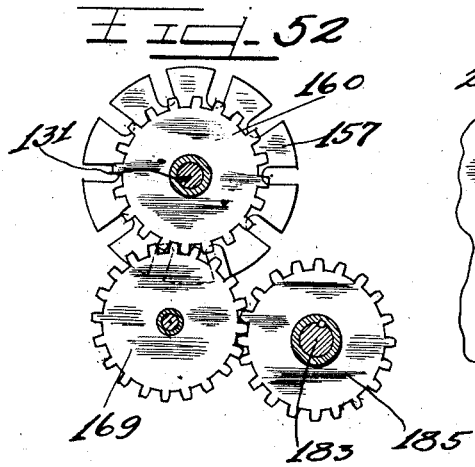
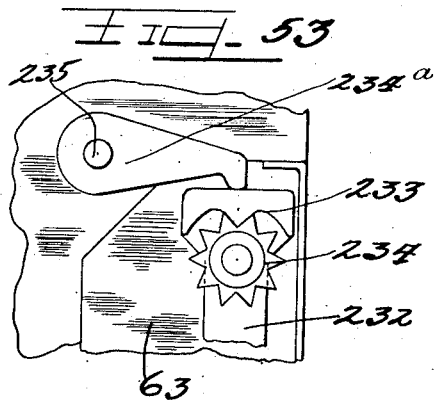
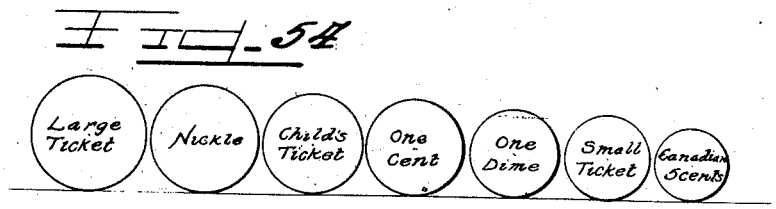
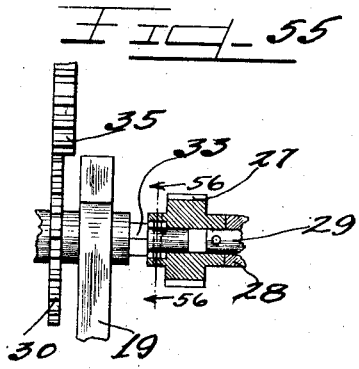
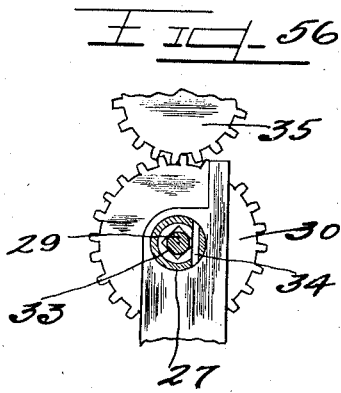
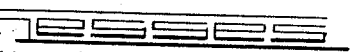

Patented July 5, 1927.

1,634,441

UNITED STATES PATENT OFFICE.

HUGO J. BAUR, OF CHICAGO, ILLINOIS, ASSIGNOR, BY MESNE ASSIGNMENTS, TO SIDNEY S. GORHAM, TRUSTEE, OF CHICAGO, ILLINOIS.

FARE BOX.

Application filed March 19, 1920. Serial No. 367,057.

This invention relates to an improved form of fare box wherein various denominations of coins or coin tokens, termed tickets, may be deposited, passing immediately to a registration mechanism and thereafter discharged to a slow travelling inspection belt visible through a view aperture, and discharging to a compartment accessible to the operator of the machine.

The machine may be power or hand driven and the several coacting mechanisms have a conjoint operation to totalize separately the various coin tokens as well as the actual cash deposited into the machine, together with the number of "fares" or passengers depositing fares, even though the actual fares may not be the same cash amount but differing owing to zone systems in which the machine is used.

It is an object, therefore, of this invention to provide a fare box wherein the coins or coin tokens deposited fall immediately into the registering mechanism, which, after counting the same individually and recording the count upon various registers visible from the exterior of the machine and each appropriated to a particular token or cash sum, discharge to an inspection belt also visible from the exterior of the machine, which discharges to a common compartment from which the coins and coin tokens may be readily removed by the operator.

It is also an object of this invention to provide a fare box adapted to totalize individual different coin tokens as well as the actual cash deposited into the machine, and equipped with a passenger fare register visible to all, which records the number of passengers or fares collected even though the amount of a fare may be different according to the distance traveled by the passenger, and with a selective gearing forming a part of the cash totalizer register mechanism which may be adjusted so that any predetermined cash amount will constitute a fare and cause actuation of the passenger fare register for each unit cash amount received into the machine.

It is also an object of this invention to provide a fare box adapted to receive various coins and various coin tokens therein differing by increments of diameter in their size which are non-uniform and operating by contact a measuring mechanism which is constructed to multiply the movement imposed to the first member thereof by contact with the coin whereby considerable movement of the measuring mechanism takes place and a movement which increases uniformly for the various sizes of coins and coin tokens which the machine receives.

It is a further object of this invention to construct a fare box to receive coins and coin tokens, with each coin token indicative of a fare, and with adjustable means to vary the cash amount to make use of any particular amount as a cash fare, and with a passenger fare register operated for each coin token fare and each cash fare received into the machine, together with individual visible registers totalizing respectively the various coin tokens and the sum total of cash fares passed through the machine.

Other and further important objects of this invention will be apparent from the disclosures in the drawings and specification.

The invention (in a preferred form) is illustrated in the drawings and hereinafter more fully described.

Drawings.

Figure 1 is a front view of a machine embodying the principles of my invention.

Figure 2 is a top plan view with the passenger fare register detached.

Figure 3 is an enlarged fragmentary view, partly broken away, showing the passenger fare register.

Figure 4 is an interior view of the machine, with parts in section and parts in elevation, taken substantially on line 4—4 of Figure 1.

Figure 5 is a section taken substantially on line 5—5 of Figure 4, with parts omitted.

Figure 6 is an interior view partly in section taken substantially on line 6—6 of Figure 4.

Figure 7 is a sectional detail on line 7—7 of Figure 6.

Figure 8 is a fragmentary diagrammatic view illustrating a portion of the entraining mechanism for passenger fare register shown in Figures 4 and 6.

Figure 9 is a central vertical section taken through the coin measuring and registering mechanism, with parts omitted and parts shown in elevation.

Figure 10 is an under side view of the rear inclined plate of the mechanism, shown in Figure 9 substantially on line 10—10.

Figure 11 is a front face view of the surface of the coin carrier plate shown in Figure 9, with the hopper removed.

Figure 12 is an enlarged detail view of one of the coin pockets of the outer carrier disk or plate.

Figure 13 is a detail section on line 13—13 of Figure 12.

Figure 14 is a plan view, with parts omitted and parts shown in section, of the secondary or inner coin carrier wheel or disk, taken substantially on line 14—14 or Figure 9.

Figure 15 is a detail section taken on line 15—15 of Figure 14.

Figure 16 is a rear view of the driving gear of the coin carrier wheels taken substantially on line 16—16 of Figure 9.

Figure 17 is a central vertical section taken through the lower end of the passenger fare register shaft assembly within the fare box casing.

Figure 18 is a fragmentary rear view of the shifting lever for the registering entraining mechanism, also shown in Figure 9.

Figure 19 is a fragmentary detail view, partly in section, of the self-aligning automatically engaging coupling for the counting mechanism shown in Figure 4.

Figure 20 is a fragmentary sectional detail view taken substantially on line 20—20 of Figure 18.

Figure 21 is a related view, with parts omitted, taken substantially on line 21—21 of Figure 20.

Figure 22 is a fragmentary view showing the driving gears within the counting mechanism which insure correct assembly and timing of the two detachable groups of mechanisms of the counting means.

Figure 23 is a detail view of one of the gears and pinions of Figure 22.

Figure 24 is a fragmentary view, partly in section, showing the driving connections for the inspection belt, coin and token counting mechanism and passenger fare register of the device.

Figure 25 is a central vertical section taken through the entraining mechanism on the vertical shaft for the passenger fare register.

Figure 26 is a fragmentary sectional detail view taken on line 26—26 of Figure 25.

Figure 27 is a bottom plan view of the mechanism shown in Figure 25.

Figure 28 is an interior view of the counters with the selective driving mechanisms therefor omitted.

Figure 29 is a detail section on line 29—29 of Figure 28.

Figure 30 is a detail view taken on line 30—30 of Figure 29.

Figure 31 is a detail top plan view of the mechanism in Figure 30, partly broken away and shown in section.

Figure 32 is a detail view at one end of the frame shown in Figure 28, showing a vertical movable slide bar, also shown in Figure 4.

Figure 33 is a similar view of a corresponding member at the opposite end of the frame of the mechanisms of Figure 28.

Figure 34 is a view similar to Figure 28, but showing the selective driving mechanisms for the counters.

Figure 35 is a central vertical section taken through said selective mechanisms.

Figure 36 is an end view of the main shaft of said mechanisms, with parts omitted showing the offset arrangement of the successive entraining figures of the mechanisms.

Figure 37 is a detail section on line 37—37 of Figure 35.

Figure 38 is an opposite view of the mechanisms of Figure 37 taken at the line 38—38 of Figure 35.

Figure 39 is a view similar to Figure 37, taken on line 39—39 of Figure 35.

Figure 40 is an opposite view of the mechanisms shown in Figure 39 taken at the line 40—40 of Figure 35.

Figure 41 is a detail view similar to Figures 37 and 39 with parts omitted.

Figure 42 is a detail section on line 42—42 of Figure 40.

Figure 43 is a fragmentary edge view of the mechanisms shown in Figure 41.

Figure 44 is a detail view of the pivoted yoke member of Figures 38 and 40.

Figure 45 is a sectional detail on the line 45—45 of Figure 44.

Figure 47:
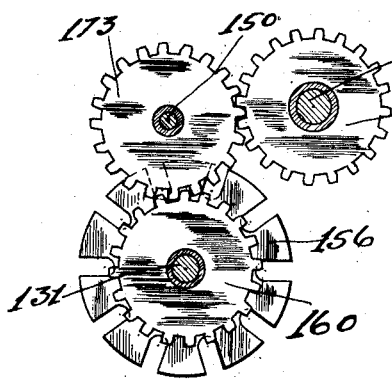
Figure 46:
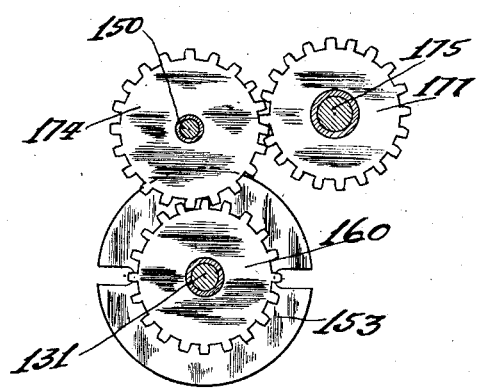
Figure 48:
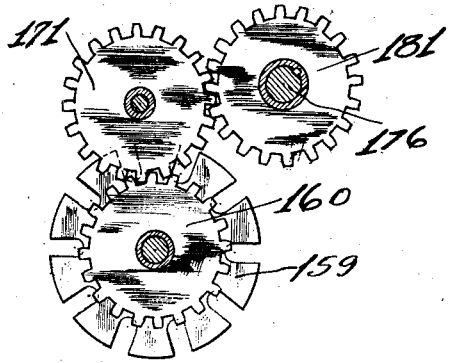
Figure 49:
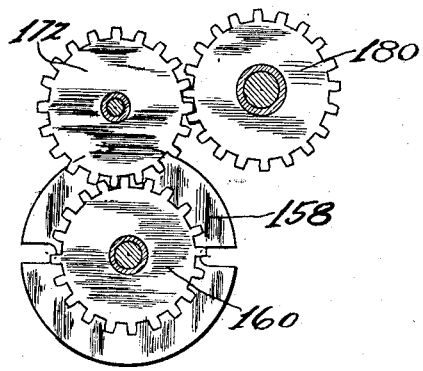
Figure 50:
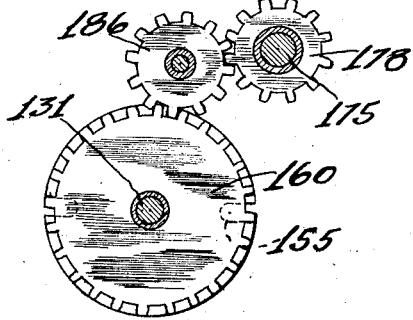
Figure 51:
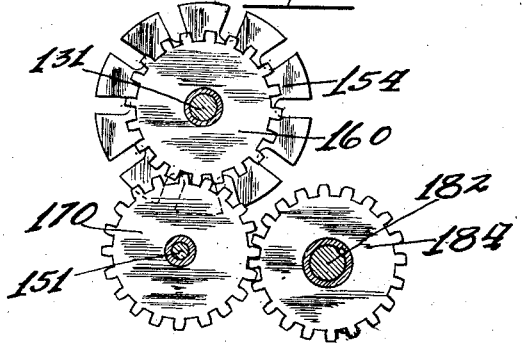

Figures 46 to 52 inclusive are detail views of each of the respective gear trains for the various register shafts.

Figure 53 is a detail view of mechanisms at one end of the counting mechanism.

Figure 54 is a view of the relative sizes of coins and cointokens which the machine is capable of handling.

Figure 55 is a fragmentary detail view of the clutch-release for the inspection belt drive.

Figure 56 is a sectional view taken on line 56—56 of Figure 55.

*Description.*

The machine consists of an enclosing casing and frame comprising a bottom 1, side walls 2, a cover section 3, a rear wall 4, and front walls 5 and 6. Within said casing, secured to the side and rear walls thereof, are horizontal partitions or floors 7 and 8, respectively. The space below the partition wall 7 is utilized as a coin collection and power drive compartment, the intermediate space between the partition walls 7 and 8 is utilized for the inspection mechanism, and situated in the compartment above the partition wall 8 and beneath the top cover section 3 are the coin receiving and counting mechanisms. As clearly shown in Figures 2 and 4, the inclined portion of the front wall 6 is provided with a view aperture and light of glass 9 to permit the mechanisms within the inspection compartment to be observed.

Attached to the casing assembly described and projecting upwardly therefrom is a tubular standard 10, which has mounted on the upper end thereof a passenger fare register 11, the particular mechanisms of which form no part of the present invention, but which, as shown, indicates the number of passenger fares received for an "in" or "out" trip, as well as the total number of passenger fares received into the machine. Secured over an opening in the top cover section 3 is a coin receiving hopper 12, which, as shown in Figure 2, has a number of apertures therein of a size to limit the coins passed therethrough to a certain denomination or diameter, permitting passage only of coins of that diameter or less. Said hopper 12, as shown in Figure 4, opens into a tortuous passage casing 13, which is attached therebeneath and disposed within the compartment above the partition wall 8, and which discharges into the inclined circular frustro-conical coin receiving hopper 14 for the counting mechanisms. Attached upon the front wall 6 is a coin receiving compartment or drawer 15, shown in Figure 4, with an opening thereto closed by a swinging hinged door 16, shown in Figure 1.

Disposed within the casing assembly at the rear thereof and adjacent one of the side walls 2 is an upright frame structure consisting of uprights 17, 18, 19 and 20, which are shown in Figure 6. Mounted upon the floor 1, within the casing is an electric driving motor 21, and connected upon the shaft thereof is a driving worm 22. A plate 23 is secured between the uprights 17—20 at the lower end thereof, and journalled to rest thereon in a suitable step bearing is a tubular vertical shaft 24. Secured upon said tubular shaft 24 is a worm pinion 25, in mesh with the worm 22 on the motor shaft, whereby the shaft 24 receives its drive. Also secured upon the tubular shaft 24 is a helical or worm gear 26, which meshes with a worm 27 mounted on a tubular shaft 28, journalled horizontally between the uprights 18 and 20, as shown in Figure 5, and having journalled therethrough a shaft 29, provided with a gear 30. Said shaft 29 is provided with a large push button 31 on the exterior of the casing and is adapted to be thrust inwardly against the compression of a suitable spring to move a squared portion 33 thereof out of register with a pin 34, which extends through the tubular shaft 28, thus disconnecting the drive between the shaft 29 and the tubular shaft 28 Figures 55 and 56. Said gear 30 is also movable with its shaft 29, but remains continually in mesh with a gear 35 of greater width disposed thereabove and secured upon one end of a shaft 36, journalled in bearings 37 mounted on a partition wall 7, shown in Figures 4 and 5. Also mounted upon said shaft 36 is a driving roll 38 for a belt 39, which is also trained about an idler roll 40 journalled between bearings 41 mounted on the forward end of the partition wall 7. Said belt 39, as clearly shown in Figure 4, travels forwardly beneath the light of glass 9 in the view aperture and, as will be hereinafter pointed out, receives and carries coins thereon, after the counting thereof, for discharge over the roll 40 into the collection compartment 15. A swinging baffle 42 is mounted above and transversely of the belt 39 to prevent coins rolling along on said belt when discharged thereto and permitting those coins lying flat upon the belt to pass undisturbed therebeneath.

As shown in Figure 17, a tooth clutch element 43 is slidably mounted upon the tubular shaft 24 and is retained thereon to rotate therewith by a pin 44, which engages through slots 45 (Fig. 24) in the tubular shaft 24. A circular shaft section 46 is mounted within said tubular shaft 24, and has said pin 44 rigidly engaged therewith. Said shaft section 46 is slidable within said tubular shaft and is normally held thrust upwardly together with the tooth clutch element by means of a coiled spring 47, which, at its lower end, seats upon a plug closure 48 threaded into the lower end of the tubular shaft 24. A co-acting clutch element 49, provided with recesses for the teeth of the clutch element 43, is journalled upon said tubular shaft 24, and the hub extension thereof extends upwardly through a suitable bearing 50 attached upon the uprights 17 and 19, and has rigidly secured thereto the hub of a bevel gear 51, shown in Figure 4. Said bevel gear 51 meshes with a bevel pinion 52, which is secured upon a shaft 53, journalled in a suitable bearing between the uprights 17 and 19. Also secured upon said shaft is a clutch disk 54, shown in Figure 19, provided with a notch 55, one edge of which is inclined as shown in Figure 4. Said clutch disk 54 is adapted to register with a drive to a clutch disk 56, shown in Figures 4, 6 and 19, which is provided with a pin 57, spring-impelled by a small leaf spring 58 toward the disk 54 and effecting driving engagement between said clutch disks only when seated in the recess 55 (Figure 19). This driving connection provides a proper timing connection between the source of power through the tubular shaft 24 and the coin counting mechanisms, which, as hereinafter described, are driven from the clutch disk 56 for the reason that driving engagement between the clutch disks 54 and 56 is only effected, even though the two are brought into juxtaposition when the spring-impelled pin 57 latches into the notch 55.

The coin and coin token counting mechanisms are removable from the machine as a unit. For this purpose, said counting mechanisms are mounted between two side frame plates 59 and 60, joined along their upper inclined edges by two flat frame plates 61 and 62, which, as shown in Figure 9, are spaced from one another. A secondary frame structure is attached to the frame structure 59—60, and to all intents and purposes forms a unitary part thereof. This secondary frame structure consists of side walls 63 and 64, which interfit flush with the side walls 59 and 60, which are recessed to receive the same, and a back plate 65 is rigidly connected between said end plates 63 and 64. This secondary frame structure is clearly shown in Figure 28, 32 and 33.

Referring back to the automatic timing driving connection between the clutch disks 54 and 56, shown in Figures 4 and 24, it will be seen that the clutch disk 56 is secured to a bevel pinion 66 by axle bolt 67, and together therewith is journalled in a bearing 68, which is bolted upon the end plate 60 of the counting mechanism structure. The bevel pinion 66 meshes with a bevel pinion 69, secured upon one end of a shaft 70, shown in Figure 21, which is journalled through the end plate 60, and an intermediate bracket plate 71, which in turn is attached upon a horizontally extending narrow bottom plate 72, secured between the end plates 59 and 60, as shown in Figure 9. Slidably mounted upon said shaft 70 is a clutch element 73, shown in Figure 21, normally impelled toward the complementary clutch formed on the hub of a gear element 74, journalled on said shaft 70, by a spring 75. Said element 74 consists of two complete gears 76 and 77, with a disk portion 78 therebetween of the pitch diameter of said gears and provided with a single tooth portion 79, shown in Figure 23. Any overload upon the coin counting mechanism, for any reason whatever, which receives its drive from the gear element 74, will cause automatic disengagement of the spring-impelled clutch member 73 against its spring 75.

Journalled in suitable bearings between the frame plates 59 and 60 is another shaft 80, provided with a gear 81, which has associated therewith a pitch circle disk 82, having two diametrically opposed notches or recess therein for co-action with the tooth 79 of the gear element 74, shown in Figure 23, so that it is impossible in the assembly of the parts to mesh the gear 81 with the gear 76 for proper co-action unless the pitch circle disks 82 and 78 are in proper relation. This insures correct timing relation between the gears.

Said gear 81 has rigidly associated therewith a bevel pinion 83, which meshes with a large bevel gear ring 84, shown in Figure 10, which rotates the coin carrier elements hereinafter described. To insure proper timing relation between the bevel pinion 83 and gear 84, the back plate portion of said gear, denoted by the reference numeral 85, is provided with a series of equidistantly spaced notches 86, shown in Figures 10 and 16, which are adapted to register with the pin 87 secured on the face of the gear 81, as shown in Figures 21 and 22, and unless the pinion 83 and gear 84 are properly meshed, the pin 87 will not register with the notch 86, and the machine cannot be operated.

As shown in Figure 9, the hub of the large gear 84 extends through apertures in the assembly inclined plates 61 and 62, and secured to said hub by means of bolts 88 are two carrier plates, walls, or disks 89 and 90, respectively, one of which is disposed over the surface of the frame plate 61 and the other of which is disposed between the frame plates 61 and 62. A domed plate 91 is secured by a bolt 92 to the hub of the gear 84 and is beveled to fit closely and smoothly to the surface of the coin carrying wheel 89. Secured to the back of the gear 84, as shown in Figures 9 and 16, is a large toothed element 93, with spaces between the toothed portions approximately twice the length of the toothed portions themselves.

Figures 11 and 14 show the construction of the respective coin carrier wheels 89 and 90. As shown, the carrier wheel 89 is provided with pockets 94, all of the same configuration and each of an iregular shape and with the metal of the carrier plate rearwardly of each pocket beveled off, as shown in Figures 12 and 13, to a comparatively thin edge. Said carrier wheel 89 is also provided with a marginal wall 95, and, as shown in Figure 9, the hopper 14 fits closely therearound and is attached upon the frame plate 61.

The carrier wheel 90, as shown in Figure 14, has elongated pockets 96 irregular in shape and with the forward end of each pocket registered beneath a pocket 94 of the carrier wheel 89, as shown in dotted lines in Figure 12. The plate 61, which lies between the coin carrier wheels 89 and 90, is provided with an aperture 97 therethrough, shown in Figures 9 and 12, and a coin carried upwardly by the wheel 89 in one of the pockets 94, upon passing over the aperture 97, falls therethrough and into one of the pockets 96 of the coin carrier wheel 90. In order to insure passage of the coin through the aperture 97, a presser plate 98 is mounted over the surface of the coin carrier wheel 89 and is provided with three bolts 99 slidable through a bracket plate 100 attached to the frame plate 61, and extending over the carrier wheel. A coil spring 101 is provided on each of the bolts 99 and operates normally to press the plate 98 downwardly against the carrier wheel 89. The forward edge of the presser plate 98 is beveled and of curved shape, as indicated by the reference numeral 102, to act as a stripper to prevent superposed coins moving beneath the presser plate 98.

The coins received through the aperture 97 from the outer carrier wheel 89 by the inner carrier wheel 90 are moved by one of the respective pockets 96 toward a measuring finger 103, which is journalled upon a shaft 104 secured through the frame plates 61 and 62. Said frame plates 61 and 62 are provided with arc shaped slots 105 and studs 106 secured to the measuring finger 103, project therethrough and have secured on their other ends beneath the frame plate 62 a tail lever 107 shown in dotted lines in Figure 14 and in full lines in Figure 10. A bracket plate 108, secured upon the rear surface of the frame plate 62, affords a support for one end of the shaft 104. The purpose of the tail lever 107 is to insure return of the measuring finger 103 after elevation by a coin moved therebeneath, and this is achieved by reason of the fact that a pin 109 on the end of the tail lever 107 is adapted to be projected into one of the spaces in the toothed element 93, shown in Figure 16, whenever the coin measuring finger 103 is elevated. Consequently, as the rotation of the parts continues, the leading inclined edge of a tooth on the element 93 will strike the pin 109 to throw the tail lever 107 outwardly and to move the measuring finger 103 downwardly to ride upon the periphery of the carrier wheel 90.

Owing to the fact that the various coins and coin tokens differ only slightly in their diameters, and also in view of the fact that the increments of difference in diameter of the same are not equal, it is desirable to multiply the movement of the measuring finger 103 to obtain a greater effect of movement initiated according to the size of a coin and also to obtain a uniform increment of increase for movement initiated by the different coins in successive order of their increasing size.

Accordingly, the end of the measuring finger 103 has a pivotal connection with a cam block 110, which is pivoted in a recessed portion of the frame plate 62 on a pivot 111 supported by a bracket plate 112, shown in Figure 10, secured on the rear surface of the frame plate 62. Said cam block 110 has an oscillatory movement depending in extent upon the lift of the measuring finger 103 imposed by a coin, and one edge of said cam block 110 has a developed contour contacted by a roller 113 mounted upon a pivoted lever 114, which is journalled on a pivot shaft 115 to impose uniform displacement movements upon said lever 114 for lifting movements which are non-uniform in character imposed upon the finger 103 by the various coins or coin tokens. The coins, after passageg beneath the measuring finger 103, fall away from the carrier wheel 90 downwardly between the plates 61 and 62 and, as shown in Figure 4, strike against the angle baffle plate 116, which directs them on to the inspection belt 39. Said pivot shaft 115, as shown in Figure 9, is secured to the under side of the frame plate 62. A sleeve 116$^a$ (Figure 20) is journalled on the shaft 115 as a spacing element, and disposed beyond the outer end of the sleeve is a long lever 117, shown in Figures 9 and 18. The difference in length between the levers 114 and 117 serves to further increase the extent of movement imparted to the mechanisms by the passage of a coin. The lower end of the lever 117 is forked and engages a projection on a U-shaped slide bar 118, which is slidable upon a stationary square shaft 119 secured between the frame plate 59 and supplementary frame plate 71, shown in Figure 21. Furthermore, as shown in Figure 20, a long bent lever 120 is secured at its upper end to the lever 114 and sleeve 116$^a$ and at its lower end is connected by two pins 121 to the lever 117. A spring 122 is coiled about the sleeve 116$^a$, with one end bearing against the end plate 59, and said spring operates to hold the lever 114 inwardly against the cam block 110 and to hold the long lever 117 normally in initial position, such as shown in Figure 18. The spring effect is also transmitted through the cam block 110 to the measuring finger 103 to normally hold the same in initial position. The purpose of the long lever 117 moving the slide bar 118 is to cause entrainment of certain gearing to actuate an appropriate register or counter for the particular coin initiating the movement, and further to entrain the drive to the passenger fare register from said counters if a fare unit has actuated the measuring finger to cause the power mechanism to shift the passenger fare register to indicate receipt of a fare.

Also secured upon the shaft 80, as shown in Figures 20 and 21, are a succession of stops 123, 124, 125, 126, 127, and 128, all of which are rigidly secured on said shaft to rotate therewith and each of which is slightly offset from the one preceding, as clearly shown in Figure 20, although the shaft 80 is in a shifted position as compared with its position in Figure 21. The purpose of these stops is to limit the sliding movement of the U-bar 118 to insure proper positioning thereof according to the shift imposed thereon by the particular coin initiating such movement. Accordingly said U-bar is provided with a lug 129 on its rear edge at its forward end which is adapted to strike against one of the projections and thereafter to be held from movement in either direction on its slide bar 119 by engagement between a pair of said projections until entraining engagement to the proper register as hereinafter described has been shifted to driving position. On the other end of the slidable U-bar 118 a projecting tooth or lug 130 is provided for engagement with any one of a number of entraining means hereinafter described.

Journaled between the frame plates 63 and 64 is a shaft 131, shown in Figure 34, and provided with a gear 132, shown also in Figure 22, which meshes with the pinion 76 of the element 74 and which is provided with a pitch circle disk 133 having a single notch therein for coaction with the tooth 79 of the element 78, so that said gear 132 cannot be meshed with the gear 76 except in a particular manner which insures correct timing thereof. As shown in Figure 28, the frame structure 63—64—65 is provided with intermediate partition plates 134 and 135 respectively, and as shown in Figure 34 bracket plates 136 and 137 are supported in position thereby and through which said shaft 131 is journaled. Also secured upon said shaft 131 as shown in Figures 20 and 34, a helix cam 138, which when the frame structure 63—64 is attached to the frame structure 59—60, is positioned adjacent the lower end of the lever 117 and is adapted to contact with a pin 139 projecting from said lever, so that after a shifting movement of the lever 117 in the event that the spring 116ª does not restore the same to normal position, said helix cam 138 contacting said pin 139 will positively retract said lever and slidable U-bar 118 to normal. Secured upon the shaft 131 between the frame plates 136 and 137, as shown in Figures 35 and 36, are a plurality of blocks 140, all exactly the same in construction but, as clearly shown in Figures 35 and 36, slightly offset angularly in successive order. As shown in Figures 38 and 42, each block 140 has a hollow rectangular yoke 141 fitted pivotally at one of its ends and at its other end engaged by a light spring 142 secured upon the block 140 to hold said yoke member outwardly substantially flush with the surface of the block 140. As will be pointed out, the assembly of seven sets of these elements in spaced relation on the shaft 131 together with the other elements holds the same in assembled relation.

Each of said hollow rectangular yoke members 141 is provided with a beveled edge finger and the respective fingers for all of said yoke assemblies are denoted by the reference numerals 143, 144, 145, 146, 147, 148, and 149. The bracket plates 136 and 137, as shown clearly in Figure 35, are connected by a pair of axially aligned bolts 150 and a long bolt 151, and assembled thereon in spaced relation by suitable spacing sleeves are a plurality of crescent or incomplete circular ring plates 152 each of which is disposed substantially aligned around a block 140, so that said block 140 and its associated members may rotate around with the shaft 131 within its particular ring plate. The respective fingers 143–149 inclusive project slightly beyond the inner periphery of each ring plate and slide lightly thereagainst, as shown in Figures 35 and 38. Journaled on said shaft 131 between each of the respective blocks 140 are associated disks and gears. Said disks are denoted respectively by the reference numerals 153, 154, 155, 156, 157, 158, and 159, and secured to each thereof are gears 160. There is a disk and gear provided for each block 140 and yoke 141 whereby the finger on the yoke may engage with the disk and cause the same to rotate therewith to permit a drive for a register as hereinafter described to be taken from the gear associated with that particular disk. All of said disks, however, are not the same in construction, although they function the same in that the proper finger for each becomes engaged therewith to rotate the disk and gear to cause registration and count of a coin. The disk 153 has two oppositely disposed notches in its periphery, the disk 154 has ten notches, the disk 155 has two notches, the disk 156 has ten notches, the disk 157 has ten notches, the disk 158 has two notches, and the disk 159 has ten notches. As will be pointed out, those disks having two notches receive a half revolution from their proper fingers and those having ten notches receive only one-tenth of a revolution from their fingers.

In order to prevent movement of any disk and gear except when operated by a finger as hereinafter pointed out, a pawl 161 is pivoted on each of the crescent ring plates 152 at the gap therein and is provided with a tooth 162 to engage into a notch of its disk. Each pawl is provided with a spring 163 to impel the same toward its disk. Each of said pawls is provided with a lifting ledge 164 on one surface thereof, as shown on the detail view of the pawl, Figure 41, to permit a finger to elevate the same when the finger has been properly shifted to perform such an operation.

As pointed out in the foregoing, each of the respective fingers 143–149 inclusive has a sliding pivotal movement on its carrying block 140 and consequently when the slidable U-bar 118 is shifted due to the passage of a coin through the machine, the lug or projection 130 thereon shown clearly in Figure 9 will be moved into the path of a particular finger which, rotating with the shaft 131, will be displaced from one side of its crescent ring plate 152 at the gap therein to the other side thereof, riding first beneath the lifting ledge 164 on the pawl 161 and immediately thereafter moving into the notch of the disk, for instance 153, to carry said disk around therewith. The finger now slides on the opposite surface of the ring plate 152 from what it ordinarily does, as the finger progresses around, moving the disk to finally register with a gap or notch 165 in the ring plate 152 which in the present instance is a half revolution of movement from the initial point, and owing to the stress of its spring 142, the finger will ride out through said notch 165 to disengage from the disk 153 simultaneously with engagement of the tooth 162 of the pawl 161 with the other notch in said disk 153.

The purpose of the shifting of the U-bar 118 has been fulfilled by this operation in that a finger has been engaged with a disk and the U-bar may then be released from its particular pair of retaining fingers of the group 123—128 and with the other mechanisms associated therewith returned to normal. The operation of the disk 153 or any other as the case may be is utilized through its associated gear 160 to operate an appropriate register as hereinafter pointed out.

For those disks 154, 156, and 157 which have ten notches the release or exit notch for their fingers is denoted by the reference numeral 166 and, as shown in Figures 37 and 38, is disposed a distance equal to a one-tenth revolution from the gap of the ring plate 152, so that after the finger 144 has imparted a one-tenth revolution to the disk 154 it is released therefrom and the pawl for the disk immediately locks the same from further movement.

Furthermore, in order to prevent accidental displacement of any disk at the time the pawl 161 is reached to disengage its tooth 162 therefrom, a roller detent 167 is provided impelled by a spring 168 which together with the detent is mounted on a ring plate 152 such that the roller detent tracks on the periphery of the disk to engage the notches thereof.

Journaled between certain of the crescent ring plates 152 on the connecting bolt 151 are two gears 169 and 170, the gear 169 meshing with the gear attached to the disk 157, and the gear 170 meshing with the gear attached to the disk 154. Similarly journaled between certain of the crescent ring plates 152 upon the connecting bolts 150 are four gears, the gear 171 in mesh with the gear attached to the disk 159, the gear 172 in mesh with the gear attached to the disk 158, the gear 173 in mesh with the gear attached to the disk 156 and the gear 174 in mesh with the gear attached to the disk 153. Journaled between the frame plates 64 and 135 is a shaft 175 and aligned therewith and abutting the same is another shaft 176 journaled between the frame plates 63 and 134, as shown in detail in Figure 29. Journaled upon the shaft 175 in the space between the frame plates 134 and 135 are gears 177, 178, and 179, and 180, the gear 177 meshing with the gear 174 and the gear 179 meshing with the gear 173, and the gear 180 meshing with the gear 172. Another gear 181 is secured upon the end of the shaft 176 and meshes with the gear 171 so that said shaft 176 is driven directly from the gears 171 and 181.

Journaled between the frame plates 64 and 135 is another shaft 182 and axially aligned therewith and journaled between the frame plates 63 and 134 is another shaft 183. Secured upon the shaft 182 is a gear 184 which meshes with the gear 170, and secured upon the shaft 183 is a gear 185 which meshes with the gear 169.

Referring back to the shaft 175 on which the four gears 177, 178, 179, and 180 are journaled, it will be noted that the gear 178 is in mesh with an idler gear 186 journaled between two of the crescent ring plates 152 and which is in mesh with the gear 160 of the disk 155. In order to operate the shaft 175 when any one of said gears journaled thereon is caused to turn and yet prevent turning of the other gears on said shaft a ratchet mechanism is provided. This ratchet mechanism consists of an apertured disk 188, there being one pinned to said shaft 175 adjacent each of the gears journaled thereon. Adjacent each of the apertured disks 188 and journaled thereon is a pawl ring 189 each provided with two teeth, as shown in Figure 30 which normally project through the apertures in the disk 188 and are adapted to project through apertures provided in the adjacent gear. As shown, coiled compression springs 190 are provided between each pair of pawl rings 189 to thrust the same away from one another toward their respective apertured disks. As shown in the detail view in Figure 31, each of the teeth of each pawl ring 189 is beveled so that it is possible when a gear such as the gear 177 is rotated to carry the disk 188 which is pinned to the shaft 175 and the pawl ring 189 therewith so that the shaft is driven. Of course whenever the shaft is driven, all of said disks 188 and pawl rings 189 necessarily rotate therewith but the gears with which the same are associated in the present instance, 178, 179, and 180 are not driven for the reason that the inclined or beveled surface of the respective pawl teeth rides out of the apertures in said gears. The other gears on said shaft 175 which are not being driven are held locked from movement due to their entrainment with the gears 160 which, of course, are held from movement by the pawls 161 engaged in their respective notched disks. However, this ratchet mechanism is unnecessary for the gears on the other shafts 176, 182, and 183, as the latter shafts have only one gear each thereon, and these are driven directly from the gears 160 when operated.

Secured upon the shaft 175 is a units-indicating number wheel 191 and journaled on said shaft in successive order adjacent thereto are tens, hundreds, thousands, and ten-thousands-indicating number wheels 192, 193, 194, and 195 respectively. A conventional form of cumulative drive therebetween, well known in registering mechanism, is provided comprising a shaft 196 secured between the frame plates 64 and 135 which has journaled thereon mutilated pinions 197, 198, 199, and 200 respectively which mesh in the case of pinion 197 with a mutilated gear 201 on the wheel 191 and a gear 202 on the wheel 192. A similar arrangement of mutilated gears is provided between each of the number wheels for coaction with its mutilated idler pinion whereby one complete revolution of one wheel imparts a one-tenth or unit count to the wheel next adjacent.

Another indicating counter or register is mounted on the shaft 176 and consists of number wheels 203, 204, 205, and 206 respectively. Similarly an indicating counter or register is mounted upon the shaft 182 and consists of number wheels 207, 208, 209, 210, and 211. Similarly another indicating counter or register is mounted upon the shaft 183 and consists of number wheels 212, 213, 214, and 215 respectively.

Operation of any of the gears 177, 178, 179, and 180 will actuate the counter 191—195; actuation of the gear 181 will actuate the counter 203—206; actuation of the gear 184 will operate the counter 207—211; and actuation of the gear 185 will operate the counter 212—215.

In this connection it is of interest to note that the gear 177 will operate the coin counter 191—195 to register a Canadian five-cent piece; the gear 178 will actuate the coin counter 191—195 to register a dime; the gear 179 will actuate the coin counter to register a penny; and the gear 180 will actuate the coin counter to register an American nickel. The gear 181 will operate the large ticket counter 203—206 to register one large ticket or token; the gear 184 will operate the small ticket or token counter 207—211 to register a single small ticket or token and the gear 185 will operate the child's ticket or token counter to register a single child's token received.

These respective coins and tokens in the order of their size are shown in Figure 54. Of course the tokens may have any predetermined value and may be sold by a traction company to the public so that it becomes unnecessary for the conductor to supply change for the correct "fare" where the fare is an odd amount if the passenger is in possession of these tokens.

Secured upon the outer end of the shaft 175 are six gears 216 and journaled on the stud shaft therebeneath are six gears of varying diameter denoted respective by the reference numerals 217, 218, 219, 220, 221, and 222 respectively, each aligned beneath one of the gears 216. As shown clearly in Figure 32, a bracket arm 223, is adjustably attached upon the frame plates 64 by means of a bolt 224 and is provided with a stud shaft 225 on which is slidably journaled a shrouded gear 226. By loosening the bolt 224 and swinging the arm 223 outwardly, the shrouded gear 226 may be disengaged from any one of the gears 216 and its corresponding gear therebeneath and reengaged by manual adjustment with any other pair of gears. Said shrouded gear is merely an idler between the gears 216 and the various sized gears 217, 218, 219, 220, 221, and 222 to vary the gear ratio of drive between the two. Associated with said various sized gears is a small star wheel 227 shown in Figure 32 having a single tooth. Slidably mounted upon the end of the frame plate 64, as shown in Figure 32, is a bar 228 having a raised portion with a tooth 229 normally in position to be contacted by the other of the star wheels 227 so that each rotation of said star wheel will cause an elevation of the sliding bar 228. The purpose of the slide bar 228 is to operate entraining means for the drive to the passenger fare register, as hereinafter described. Inasmuch as the star wheel 227 is operated from the coin counter shaft 175, it is obvious that registration of a certain number or sum of coins will cause a complete rotation of the star wheel 227 through one pair of the groups of gears mentioned. It is the purpose of the mechanism to cause operation of the slide-bar 228 for each rotation of the star wheel 227 when a predetermined sum constituting one "fare" is registered. This predetermined sum or "fare" may be changed to suit conditions, that is, the fare may be made any amount either five cents, six cents, seven cents, eight cents, nine cents, or ten cents as desired, with the mechanism shown herein.

Referring to Figure 28 in this connection, drive from a gear 216 directly through the shrouded gear 226 to the gear 222 will cause one revolution of the star wheel 227 for each ten cents registered by the coin counter 191—195. Similarly when the shrouded gear is shifted and set to the next position, the drive to the gear 221 will cause one revolution of the star wheel 227 for each nine-cent "fare" received. Similarly for the gear 220 the corresponding "fare" is eight cents, for the gear 219 the corresponding "fare" is seven cents, for the gear 218 the corresponding "fare" is six cents, and for the gear 217 the corresponding "fare" is five cents. Of course other gear ratios may be used to obtain any desired "fare" amount and the range of adjustment to increase or diminish the number of possible fares to be utilized in operating the passenger fare register may be changed by the use of other gears.

Another star wheel 230 having ten teeth is secured upon the end of the shaft 182 and said slide bar 228 is provided with a projecting tooth 231 engaging therewith, so that each count movement of the star wheel 228 will cause elevation and lowering of the slide bar. Thus, for each count on the small ticket or token register 207—211, the star wheel 230 will move one tooth and elevate the slide bar.

As shown in Figure 33, another slide bar 232 is mounted on the end of the plate 63 and is provided with a tooth 233 resting in a star wheel 234 secured upon the outer end of the shaft 176 for the large ticket register 203—206. Resting upon the upper end of the slide bar 232 is a crank 234ª which is attached longitudinally to a long shaft 235 journaled between the frame plates 59 and 60, as shown in Figure 53 and at the other end having secured thereon the lever 236 shown in Figure 4. It is apparent therefore that elevation of either of the slide bars 228 or 232 will cause operation of said lever 236.

Another tooth projection 237 is provided on said slide bar 232 and rests upon a star wheel 238ª which is secured upon the end of the shaft 183 for the child's ticket or token counter 212—215. An actuation of one count to either the large token counter 203—206 or the child's token counter 212—215 will cause an elevation of the slide bar 232. Said respective slide bars return after each elevation partly by gravity and also due to the fact that a spring 239ª is coiled about the shaft 235 attached at one end to the end of the plate 60 and at its other end to said shaft 235 as shown in Figure 9.

The detail of the lever connections for the lever 236 is shown in Figure 8. Pivotally connected upon one end of the lever 236 is a depending link 238 which is slotted to engage a guide pin 239 secured in the end plate 60. The lower end of the link 238 is forked and is adapted to engage a pin 240 secured in the end of an arm 241 of a three-arm lever which is pivoted on the stud 244 secured in the upright 19.

This forked-end pin connection 240 and the disk connection 54—56 are the only connections between the entire coin and coin token counting mechanism which may be withdrawn from the casing and replaced therein by detachment of the front plate 5 to which the back plate 65 of the counting mechanism is attached. The purpose of the three-arm lever 241—242—243 is to operate an entraining mechanism to cause actuation of the passenger fare register when any cash sum or coin or coin token is passed through the counting mechanism which is the equivalent of a passenger "fare."

Secured upon the upper end of the tubular shaft 24 is a disk member 245 which has a projection or raised portion 246 on its surface shown in Figures 26 and 27. Pivoted on the under surface of the disk 245 on a pintle extending through said raised portion 246 is a yoke 247 which at its outer end is provided with a beveled finger 248. Said yoke is also provided with an upwardly directed tooth 249 adjacent the beveled finger 248 and said tooth normally reposes in a notch or cut-away portion of the disk 245 with the upper end of the tooth slightly below the top surface of the disk. A horizontal partition plate 250 is secured directly beneath the disk 245 between the uprights 17—20 and as shown in Figure 26 has a large circular opening therethrough substantially of the diameter of the disk 245 and further provided with four notches 251. All of said notches are beveled at one end, as clearly shown in Figure 26, denoted by the reference numeral 252 to afford easy entrance of the finger or tooth 248 upwardly through the notches whereby said finger may slide upon the top surface of the disk 250 until the next adjacent notch 251 is reached whereupon the finger will fall therethrough by gravity owing to the weight of the yoke 247. Whenever the finger 248 rides upwardly through a notch 251 the tooth 249 is elevated to engage in one of the four notches 253 provided in a disk 254 which is rigidly secured on the lower end of a tubular shaft 255 which is coaxial and abuts with the upper end of the tubular shaft 24. As clearly shown in Figure 8, a large gravity pawl 256 is pivoted on the upright 20 and is disposed to latch into any of the four notches 253 of the disk 254. The spring 256ª is provided to insure positive action of the pawl 256. Said pawl is provided with a large flat bearing surface beneath which the tooth 249 may engage to elevate the pawl 256 simultaneously with movement of the tooth 249 upwardly into the notch 253, so that interlocking of the disk 254 with the disk 245 is accomplished substantially simultaneously with the release of said disk 254 by elevation of its pawl.

It is desired to cause interlocking of the disk 245 and 254 whenever the lever 236 is operated by passage of a "fare" through the counting mechanism. The arms 243 are so positioned that the ends thereof are normally below the path of circular movement of the finger 248, but when the lever 236 is operated the arms 243 are raised and the timing of the mechanisms is such that the finger 248 is approaching at that instant, and accordingly is given an upward movement into the notch 251 of the plate 250 to engage the beveled portion 252 and the continuing rotation of said finger 248 causes the same to be elevated to ride around on the top surface of the plate 250 to the next notch 251. This, of course, causes elevation of the finger 249 and interlocking of the disks 245 and 254.

Whenever the three-arm lever is operated from the lever 236 to elevate the arms 243, it is desirable to maintain said arms 243 elevated until the finger 248 shall have traveled thereagainst and been elevated thereby above the plate 250. For this purpose a slide bar 257 is provided, shown in Figure 7, which normally is in its retracted position, shown in Figure 7, with its end abutting the arm 242 which is in a position past the uprights 19, as shown in Figure 8, thereby holding said slide bar retracted against the stress of its spring 258. Said spring 258 bears at one end against the stop stud 259 and at its other end against an inwardly turned lug 260 on the inner surface of the slide bar 257. When the three-arm lever is operated, the arm 242 moves rearwardly permitting the slide bar to move outwardly beyond the upright 19 thereby holding the arm 242 rearwardly and likewise holding the arms 243 elevated for the purpose pointed out. Four pins 261 are provided on the upper surface of the disk 254 and each one is disposed in a position such that by rotation of the disk 254 a pin will retract the slide bar 257 by contact with the lug 260. Of course, immediately thereafter the arm 242 of the three-arm lever is actuated inwardly and the arms 243 downwardly from the lever 236 owing to the spring 237 on the shaft 235. Thus the finger 248 elevated by the arms 243 cannot, after release through one of the notches 251 of the plate 250, be again elevated to interlock the disk unless a "fare" has passed through the machine to cause operation of the lever 236 and consequently elevation of the arms 243.

The upper ends of the uprights 17—20 are joined by a plate 262 in which is engaged the lower tubular section 264. The long tubular standard 10 is adapted to be fitted thereto by means of the jaw connections shown in dotted lines and is threaded downwardly onto the tubular section 264. Extending upwardly through the tubular shaft 255, which also extends upwardly through the standard 10 is a long rod 265, shown clearly in Figure 24, which at its lower end rests upon the upper end of the interior rod 46 of the tubular shaft 24. As shown in Figure 3, the upper end of the rod 265 extends into the fare register case 11 and rests thereon at one end of a lever 266, the other end of which rests upon one end 267 of a bell crank having a long arm 268 which at its upper end engages with a slide bar "re-set" knob 269 of the passenger fare register. The particular mechanism of the passenger fare register forms no part of the present invention but re-setting thereof is performed by pulling the knob 269 outwardly and rotating the same. Pulling said knob 269 outwardly operates to cause a depression of the rod 265 which, as shown in Figure 24, pushes the rod 46 downwardly carrying the toothed clutch member 43 downwardly from the clutch member 49 so that the drive from the tubular shaft 24 to the beveled gear 51 leading to the counting mechanisms is disconnected and no coins can be counted while the passenger fare register is being re-set. Incidentally, since the actuation of the passenger fare register depends upon the actuation of the coin counting mechanisms, it is apparent that the passenger fare register cannot be operated while being re-set.

*Operation.*

When the coins or coin tokens are deposited into the hopper 12 they fall immediately through the tortuous passage 13 into the hopper 14 and upon the coin-carrying wheel 89. The pockets in said coin-carrying wheel pick up the coins singly and carry the same beneath the stripper 98 over the aperture 97, shown in Figure 12, through which the coin falls into one of the pockets 96 of the inner coin-carrying wheel 90. The coin is then carried by the wheel 90 beneath the measuring finger 103, shown in Figure 14, to elevate the same and incidentally move the arm 107 connected thereto inwardly into one of the spaces of the notched member 93 shown in Figure 16. After the coin has passed beneath the measuring finger 103, a tooth on the notched member 93 will swing the lever 107 outwardly to insure positive return of the measuring finger 103 to normal.

The movement imposed upon the measuring finger 103 by the coin is multiplied so that although the coins do not vary uniformly in size the increment of movement of the parts for the various coins is uniform and of constant extent. This increase of movement is achieved by use of cam block 110 to which the measuring finger is connected and which receives the oscillatory movement therefrom. Said cam block 110 has a developed contour for contact with the roller 113 on a crank 114 to impart a differentially uniform displacement movement to the crank 114 for the different coins. This movement is multiplied by reason of the long lever 117 which is connected to the lever 114, as shown in Figure 20 and which serves to shift the slidable U-bar 118 to a certain position on its rod 119 according to the denomination of coin initiating the movement. Timed for operation with the sliding movement of the U-bar 118 is the shaft 80 having the six stops 123—128 thereon between any of which a lug 129 on the U-bar 118 may be confined at the instant the U-bar reaches its position of maximum displacement for the particular coin passing. While the U-bar 118 is thus held for the time by the stops on the shaft 80 which, of course, however, are continuously rotating, the lug or finger 130 on said U-bar has been moved into one of the several paths of movement of the various fingers on the shaft 131 which is continually rotating, causing one of said fingers 143—149 inclusive to move inwardly back of its particular crescent ring plate 152 at the same time, while continuing to rotate and elevating a pawl 161 out of engagement with its particular disk journaled adjacent said finger on the shaft 131.

Consider, for instance, the finger 143 shown in Figure 41 which retracts its pawl 161 from the disk 153 and engages with the notch in the disk 153 to cause the disk to move around therewith until the finger reaches the notch 165 in its guide plate 152 which permits the finger to spring upwardly therethrough releasing the disk 153 which simultaneously is locked from further movement by its pawl 161. This movement imparted to the disk 153, however, causes its gear 160 to rotate a half revolution therewith and thereby drive the gear 174, shown in Figures 34 and 35. The gear 174 meshes in turn with the gear 177, shown in Figure 28, journaled on the shaft 175 which drives the disk 188 through the spring impelled pawl ring 189 shown in Figure 30 to operate the shaft 175 to register the count of a Canadian five-cent piece upon the coin counting register 191—195. Of course, all of the pawl rings are simultaneously operated as each of their respective apertured disks are secured to the shaft 175 but the gears 178, 179, and 180 do not move inasmuch as the teeth on said pawl ring members are beveled so as to ride out of apertures therefor in said gears. This pawl connection permits the shaft 175 for the coin register to be operated by driving any one of the gears 177—180 inclusive, but the other gears remain stationary held so by engagement with the gearing of the selective finger mechanism.

Similarly the finger 144 adapted for coaction with the disk 154 causes operation of the gears 170 and 184 for the small ticket or token register 207—211.

The finger 145 serves to operate the disk 155 which, through the gears 186 and 178 operates the coin register 191—195 to register a dime.

The finger 146 is adapted to cause operation of the disk 156 for causing a drive through the gears 173 and 179 to the coin counter 191—195 to register a penny. The finger 147 is adapted to cause a drive to the disk 157 to operate the gears 169 and 185 to drive the child's ticket or token register 212—215.

The finger 148 is adapted to cause a drive to the disk 158 which, through the gears 172 and 180, imparts a drive to the coin counter 191—195 to register a nickel.

The finger 149 serves to cause a drive to the disk 159 which, through the gears 171 and 181, actuates the large ticket or token counter 203—206 to register a large ticket or token.

Figure 28 shows an arrangement of gears from which a drive may be taken from the shaft 175 from any one of the gears 216 through a shiftable idler gear 226 to any one of six various-sized gears 217—222 to impart movement to a single toothed star wheel 227. By this arrangement it is possible through the different gear ratios obtainable to effect a complete revolution of the single toothed star wheel 227 for any sum from five to ten cents which is registered on the coin counter 191—195. Every revolution of the single toothed star wheel 227 will cause an elevation of the slide bar 228. Similarly every one-tenth revolution of the shaft 182 having the star wheel 230 for the small ticket or token register 207—211 will cause an elevation of said slide bar 228. Likewise, as shown in Figure 33, a one-tenth revolution of the shaft 176 of the large ticket or token counter 203—206 will cause elevation of the slide bar 232. Similarly a one-tenth revolution of the shaft 183 having the star wheel 238ª for the child's ticket or token counter 212—215 will cause elevation of the slide bar 232.

Elevation of the slide bar 228 or 232 will cause operation of the lever 236 which will depress the link 238 operating the entraining mechanism shown in Figure 8. That is, the arm 242 will be retracted so that the slide bar 257 will spring outwardly therepast to hold the same retracted. The arm 243 will be held elevated due to the said movement of the slide bar 257, and the finger 248 shown in Figure 26 will ride upwardly upon contact with the arm 243 through the notch 251 to rest and rotate upon the plate 250. This elevation of said finger 248 which is on the yoke 247 pivoted beneath the disk 245 will cause elevation of the tooth 249 shown in Figure 25 to raise the pawl 256 shown in Figure 8 and will engage in the notch 253 of the disk 254, thus locking said disks 245 and 254 together. Thus the disk 245 intermittently drives the tubular shaft 255 which leads upwardly to the mechanism for the passenger fare register 11.

Said finger 248 will fall downwardly through the next succeeding notch 251 in the plate 250 thereby disconnecting the drive between said disks 245 and 254 at a quarter revolution thereof, and registration of a "fare" will have been effected in the passenger fare register. Coincidently with the rotation of the disk 254 after being interlocked with the disk 245, one of the four pins 261 will engage the lug 260 of the slide bar 257 shown in Figure 7 to retract the slide bar, permitting the arm 242 to again swing inwardly over the end thereof to hold the same retracted coincidently with lowering of the arm 243 out of the path of the finger 248 which thereafter continues to rotate beneath the plate 250.

The tubular shaft 24 is constantly driven from the worm gear 25 which meshes with the worm 22 on the shaft of the driving motor 21. The drive for the inspection belt 39 is obtained from the shaft 24 through worm gear 26 and worm 27. The worm 27 drives the shaft 29 which is slidably mounted and may be moved inwardly against spring pressure by operating the exterior push button 31. Normally the gear 30 is driven by said shaft 29 but when the shaft is moved inwardly is released and said gear 30 meshes with a gear 35 thereabove which is secured on the shaft 36 for the belt roller 38. Thus the drive through the belt 39 may be disconnected, and coins on said belt 39 discharged thereto from the coin counting mechanism may be viewed through the window 9 whenever the button 31 is depressed.

The drive for the coin counting mechanism is received from the tubular shaft 24 through the clutch members 43 and 49 and the beveled gears 51 and 52. The beveled gear 52 has connected thereto the disk clutch element 54 which receives the disk clutch element 56 registered therewith when the coin counting mechanism is placed in the casing and the spring impelled pin 57 shown in Figure 19 will latch into the single notch 55 of the disk 54 to insure driving connection for the coin counting mechanism properly timed for the drive to the passenger fare register.

As pointed out the drive is automatically disconnected from the coin counting mechanism whenever the knob 269 on the passenger fare register 11 is drawn outwardly to re-set the register in view of the fact that this causes depression of the rod 265 which, as shown in Figure 24, moves the slidable clutch element 43 on the rod 46 downwardly on the tubular shaft 24 out of driving relation with the clutch element 49.

I am aware that numerous details of construction may be varied through a wide range without departing from the principles of this invention, and I therefore do not purpose limiting the patent granted otherwise than necessitated by the prior art.

I claim:

1. A counting mechanism adapted to count various coins according to the size thereof comprising a coin-carrying wheel to separate coins, a secondary carrying wheel to receive coins therefrom, a measuring finger operated by contact with the coin on said second-mentioned wheel an amount dependent upon the size of the coin to effect proper registration thereof and means associated with the secondary wheel for returning said measuring finger to normal position after each operation thereof.

2. A counting mechanism comprising two coin-carrying wheels connected together, one adapted to elevate coins for discharge to the other, a measuring finger adapted to be contacted by coins on the second-mentioned wheel a register entrained for operation according to the movement of said measuring finger to totalize the various coins appropriately and means for returning the measuring finger positively to normal position.

3. A counting mechanism comprising a pair of inclined coin-carrying wheels, one adapted to discharge coins to the other thereof, a plate between said wheels having a plurality of apertures therein and coin counting devices set in operation by coins on said second-mentioned wheel.

4. A coin counting mechanism comprising a pair of connected coin-carrying wheels, an apertured plate therebetween permitting discharge of coins from one of said wheels to the other, a measuring finger adapted to be contacted by coins on the latter carrying wheel and totalizing devices set in operation thereby to register the coins.

5. In a counting mechanism, a coin carrying means, a measuring lever for contacting coins carried thereby, a plurality of means for multiplying the movement of said measuring lever, and means for transmitting a uniform increment of movement from said lever for varying increments of movement imparted thereto by the non-uniform coins.

6. In a counting mechanism, a coin carrying means, a measuring lever for contacting coins carried thereby, a plurality of means for multiplying the movement of said measuring lever, means for transmitting a uniform increment of movement from said lever for varying increments of movement imparted thereto by the non-uniform coins, and multiplying means associated with said transmission means.

7. A fare box comprising a power drive, a removable counting mechanism mounted therein, and timing connections between the power drive and the counting mechanism automatically and correctly engaged by insertion of the counting mechanisms into the fare box.

8. In a fare box a counting mechanism a power drive, releasable driving connections between said power drive and counting mechanism, means forming a part of said releasable driving connections to insure correct timing of the drive to the counting mechanism when assembled with the fare box, a passenger fare register connected on said fare box adapted to be driven by the power drive when a certain amount passes through said counting mechanism, and means for changing the amount which causes operation of said passenger fare register.

9. A counting mechanism adapted to count various coins according to the size thereof comprising a coin-carrying wheel to separate coins, a secondary carrying wheel connected thereto to receive coins therefrom, a measuring finger operated by contact with the coins on said second-mentioned wheel an amount dependent upon the size of the coin, and counters selectively operable by reason of movement of said finger.

10. A counting mechanism comprising a coin carrier having pockets therein, a second coin carrier concentric and rotatable therewith and spaced therefrom, a passage through which coins move from said first carrier to said second carrier, a measuring finger adapted to contact a coin on said second carrier, a plurality of registers certain ones adapted to register certain types of coins, and means shifted by said measuring finger to appropriately entrain the proper register for registration of the coin actuating said measuring finger.

11. In a counting mechanism, a coin carrier, means contacting a coin to be shifted by the coin, a plurality of moving fingers, gearing normally at rest adjacent each thereof, and means shifted by said coin-contacted means to offset one of said fingers and entrain its gearing to effect appropriate registration of the coin.

12. A coin counting mechanism comprising means to advance a coin, a finger to contact the coin, a plurality of registers appropriated to different types of coins, a drive for each thereof, a plurality of constantly moving fingers one appropriated for each type of coin, and means shifted by said finger to shift one of said moving fingers to entrain the proper register for registration of the particular type of coin.

13. In a machine of the class described, totaling mechanisms, a coin measuring finger, and means for transmitting movements which vary by regular increments to the totaling mechanism upon engagement of the measuring finger by coins which vary in size by irregular increments.

14. A coin counting mechanism comprising means shiftable different amounts by contact with different coins, mechanism associated therewith to multiply the shifting movement and insure uniform displacements of said mechanism for the different coins, a plurality of registers each appropriated to certain types of coins and a drive for each register entrained by said mechanism to effect registration of a coin.

15. A counting mechanism comprising a coin carrier having pockets therein, a second coin carrier rotatable therewith and spaced therefrom, a passage through which coins move from said first carrier to said second carrier, a measuring finger adapted to contact a coin on one of said carriers, and means shifted by said measuring finger to cause registration of the coin actuating said measuring finger.

16. In a counting mechanism, a plurality of coin carriers, means contacting a coin on one thereof to be shifted by the coin, a plurality of moving fingers, a register normally at rest adapted to be driven thereby, and means shifted by said coin-contacted means to offset one of said fingers and entrain the same to effect appropriate registration of the coin.

17. In a machine of the class described, a plurality of totaling mechanisms, a coin measuring finger, and cam controlled means for transmitting movements which vary by regular increments to the totaling mechanism upon engagement of the measuring finger by coins which vary in size by irregular increments.

18. A coin counting mechanism comprising means shiftable by a coin, a register, a plurality of continually moving fingers one for each type of coin, and mechanism operated by said shifting means to contact and displace one of said moving fingers to entrain the drive to the register for registration of the coin.

19. In a counting mechanism, a coin carrying means, a measuring lever for contacting coins carried thereby, a plurality of connected levers for multiplying the movement of said measuring lever brought about by contact thereof with a coin, slidably mounted register entraining means connected to said lever, and interlocking means associated with said slidably mounted register entraining means.

20. In a counting mechanism, a coin carrying means, a measuring lever for contacting coins carried thereby, a plurality of means for multiplying the movement of said measuring lever, and an irregular cam connected with said last mentioned means for transmitting a uniform increment of movement from said means for varying increments of movement transmitted thereto by the coins.

In testimony whereof I have hereunto subscribed my name.

HUGO J. BAUR.